US009676889B2

(12) United States Patent
Nabuurs et al.

(10) Patent No.: US 9,676,889 B2
(45) Date of Patent: Jun. 13, 2017

(54) POLYMER, PROCESS AND COMPOSITION

(71) Applicant: DSM IP ASSETS B.V., Heerlen (NL)

(72) Inventors: Tijs Nabuurs, Echt (NL); Gerardus Cornelis Overbeek, Echt (NL); Ronald Tennebroek, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 64 days.

(21) Appl. No.: 14/376,173

(22) PCT Filed: Feb. 4, 2013

(86) PCT No.: PCT/EP2013/052168
§ 371 (c)(1),
(2) Date: Aug. 1, 2014

(87) PCT Pub. No.: WO2013/113932
PCT Pub. Date: Aug. 8, 2013

(65) Prior Publication Data
US 2015/0024217 A1 Jan. 22, 2015

(30) Foreign Application Priority Data

Feb. 3, 2012 (EP) .................... 12153838
Feb. 3, 2012 (EP) .................... 12153839
Feb. 3, 2012 (EP) .................... 12153840
Feb. 3, 2012 (EP) .................... 12153842
Jul. 10, 2012 (EP) .................... 12175782
Jul. 10, 2012 (EP) .................... 12175784
Jul. 10, 2012 (EP) .................... 12175785
Jul. 10, 2012 (EP) .................... 12175786
Jul. 10, 2012 (EP) .................... 12175788

(51) Int. Cl.
*C09D 135/02* (2006.01)
*C09D 175/08* (2006.01)
(Continued)

(52) U.S. Cl.
CPC .......... *C08F 301/00* (2013.01); *B05D 3/0254* (2013.01); *B05D 3/06* (2013.01); *B05D 3/108* (2013.01); *C08F 8/32* (2013.01); *C08F 8/42* (2013.01); *C08F 8/44* (2013.01); *C08F 22/10* (2013.01); *C08F 22/38* (2013.01); *C08F 26/06* (2013.01); *C08F 220/06* (2013.01); *C08F 220/14* (2013.01); *C08F 220/18* (2013.01); *C08F 222/14* (2013.01); *C08F 293/005* (2013.01); *C08L 33/02* (2013.01); *C08L 33/10* (2013.01); *C08L 33/12* (2013.01); *C08L 35/02* (2013.01); *C08L 51/003* (2013.01); *C08L 67/08* (2013.01); *C08L 75/04* (2013.01); *C09D 125/14* (2013.01); *C09D 133/02* (2013.01); *C09D 133/08* (2013.01); *C09D 133/10* (2013.01); *C09D 133/12* (2013.01); *C09D 133/14* (2013.01); *C09D 135/02* (2013.01); *C09D 151/003* (2013.01); *C09D 153/00* (2013.01); *C09D 167/08* (2013.01); *C09D 175/04* (2013.01); *C09D 175/08* (2013.01); *C08F 222/04* (2013.01); *C08F 2220/1825* (2013.01); *C08F 2438/03* (2013.01);
(Continued)

(58) Field of Classification Search
CPC ...... C08F 8/32; C08F 8/42; C08F 8/44; C08F 22/10; C08F 22/38; C08F 220/06; C08F 220/14; C08F 220/18; C08F 2201/52; C08F 222/04; C08F 222/14; C08F 2220/1825; C08F 2438/03; C08F 26/06; C08F 2800/20; C08F 2810/20; C08F 2810/50; C08F 293/005; C08F 301/00; B05D 3/06; B05D 3/0254; B05D 3/108; C09D 125/14; C09D 131/003; C09D 133/02; C09D 133/08; C09D 133/10; C09D 133/12; C09D 133/14; C09D 135/02; C09D 153/00; C09D 167/08; C09D 175/04; C09D 175/08; C08L 33/02; C08L 33/10; C08L 33/12; C08L 35/02; C08L 51/003; C08L 67/08; C08L 75/00; C08L 75/04; Y10T 428/31551; Y10T 428/31786; Y10T 428/3935; Y10T 428/31938; Y02P 20/582
USPC .................... 428/423.1; 524/507; 427/385.5
See application file for complete search history.

(56) References Cited

U.S. PATENT DOCUMENTS 5,739,194 A * 4/1998 Natesh et al. ............... 524/457
2009/0246430 A1* 10/2009 Kriegel .............. C08G 63/183
428/36.6

(Continued)

FOREIGN PATENT DOCUMENTS

WO      WO 97/49747      12/1997
WO      WO 2011/073417    6/2011
WO      WO 2012/084973    6/2012

OTHER PUBLICATIONS

International Search Report for PCT/EP2013/052168, mailed Mar. 28, 2013.

(Continued)

*Primary Examiner* — Thao T Tran
(74) *Attorney, Agent, or Firm* — Nixon & Vanderhye P.C.

(57) ABSTRACT

There is described an aqueous urethane acrylate copolymer dispersion comprising a) from 10 to 95 wt-% of a polyurethane copolymer, and b) from 5 to 90 wt-% of a polyvinyl copolymer, where vinyl copolymer (b) comprises from 30 parts to 100 parts by weight of biorenewable monomer(s)—such as itaconic acid, itaconate diesters and/or diamides for example dimethyl itaconate (DMI) or dibutyl itaconate (DBI) and where optionally the composition has a residual monomer level of less than 5000 ppm.

13 Claims, No Drawings

(51) Int. Cl.

| | |
|---|---|
| C09D 125/14 | (2006.01) |
| C09D 133/08 | (2006.01) |
| C08F 301/00 | (2006.01) |
| C08F 220/14 | (2006.01) |
| C08F 222/14 | (2006.01) |
| C08F 293/00 | (2006.01) |
| C09D 153/00 | (2006.01) |
| C08F 220/06 | (2006.01) |
| C09D 133/02 | (2006.01) |
| C09D 133/12 | (2006.01) |
| C08L 33/02 | (2006.01) |
| C08L 33/12 | (2006.01) |
| B05D 3/02 | (2006.01) |
| B05D 3/06 | (2006.01) |
| B05D 3/10 | (2006.01) |
| C08F 22/10 | (2006.01) |
| C08F 22/38 | (2006.01) |
| C08F 26/06 | (2006.01) |
| C09D 133/14 | (2006.01) |
| C08L 33/10 | (2006.01) |
| C08L 51/00 | (2006.01) |
| C08L 67/08 | (2006.01) |
| C08L 75/04 | (2006.01) |
| C09D 133/10 | (2006.01) |
| C09D 151/00 | (2006.01) |
| C09D 167/08 | (2006.01) |
| C09D 175/04 | (2006.01) |
| C08L 35/02 | (2006.01) |
| C08F 8/32 | (2006.01) |
| C08F 8/42 | (2006.01) |
| C08F 8/44 | (2006.01) |
| C08F 222/04 | (2006.01) |
| C08L 75/00 | (2006.01) |
| C08F 220/18 | (2006.01) |

(52) U.S. Cl.
CPC ...... C08F 2800/20 (2013.01); C08F 2810/20 (2013.01); C08F 2810/50 (2013.01); C08L 75/00 (2013.01); C08L 2201/52 (2013.01); Y02P 20/582 (2015.11); Y10T 428/31551 (2015.04); Y10T 428/31786 (2015.04); Y10T 428/31935 (2015.04); Y10T 428/31938 (2015.04)

(56) References Cited

U.S. PATENT DOCUMENTS

| | | | |
|---|---|---|---|
| 2011/0274892 A1* | 11/2011 | Chang | B29C 47/0021 428/195.1 |
| 2014/0058031 A1* | 2/2014 | Overbeek et al. | 524/521 |
| 2014/0065435 A1* | 3/2014 | Overbeek | 428/461 |

OTHER PUBLICATIONS

Written Opinion of the ISA for PCT/EP2013/052168, mailed Mar. 28, 2013.

* cited by examiner

POLYMER, PROCESS AND COMPOSITION

This application is the U.S. national phase of International Application No. PCT/EP2013/052168, filed 4 Feb. 2013, which designated the U.S. and claims priority EP Application No. 12153842.5, filed on 3 Feb. 2012; EP Application No. 12153840.9, filed on 3 Feb. 2012; EP Application No. 12153839.1, filed on 3 Feb. 2012; EP Application No. 12153838.3, filed on 3 Feb. 2012; EP Application No. 12175782.7, filed on 10 Jul. 2012; EP Application No. 12175784.3, filed on 10 Jul. 2012; EP Application No. 12175785.0, filed on 10 Jul. 2012; EP Application No. 12175786.8, filed on 10 Jul. 2012 and EP Application No. 12175788.4, filed on 10 Jul. 2012, the entire contents of each of which are hereby incorporated by reference.

The present invention relates to polymers and polymeric materials obtained and/or obtainable from monomers such as 2-methylidenebutanedioates (also referred to herein as itaconates) and/or from monomers closely related to itaconates; to a process for making such polymers and to their use to prepare for example coatings, inks and/or adhesives.

Itaconate ester monomers have been described for very many years and can be obtained from biorenewable sources. However they have not been widely used to make commercial vinyl polymers because they are expensive and often difficult to process.

Aqueous emulsions of urethane acrylate copolymers (also referred to as urethane-polyvinyl polymers) may be prepared from a polyurethane component and an aqueous polyvinyl phase of which poly(meth)acrylate copolymers are a good example. Urethane-acrylate copolymers are known to combine the excellent properties of the polymers formed from their constituent monomers with the lower raw material costs of polyvinyl copolymers. However until now urethane-acrylate copolymers have not been widely used as they often suffer from undue sensitivity towards water or ethanol. This may be due to many factors. A relatively high acid concentration is needed to emulsify the polyurethane component. Urethane-acrylates typically contain a large proportion of acid functional polymer chains of low molecular weight. Urethane acrylates are often prepared using large amounts of volatile organic compounds (VOC).

Urethane acrylates have several other disadvantages. Urethane acrylates form films poorly at room temperature and require addition of large amounts of film forming assistants. Their coating films can have poor flexibility (low elasticity) and/or may block too readily. Urethane acrylate compositions can have a high level of residual monomer.

It is an object of the invention to solve some or all of the problems mentioned herein.

Prior art documents that describe urethane-acrylates are discussed below.

US2010/0104872 (Archer Daniels Comp) describes a composition comprising a biobased waterborne polyurethane/acrylic hybrid latex. The document mostly refers to biobased polyols though biobased (meth)acrylates are also disclosed (page 3 paragraph 0030) none of which are specifically exemplified. The amounts in which these (meth) acrylates might be used in the compositions is not suggested.

EP189945 (Witco Corp) describes a general method of preparing an aqueous PUD from a polyurethane prepolymer which is dispersed in water and then chain extended to obtain a material with unsaturated groups which is polymerised to produce a polyurethane-polyacrylate combination. Neither biorenewability nor itaconate esters are mentioned.

WO99-16905 (=EP1015507) (Avecia) describes aqueous polymer dispersions of a polyurethane dispersion (PUD) and a vinyl polymer in a respective weight ratio of from 30/70 to 5/95. The PUD is obtained by chain extending the product produced by reacting: a NCO isocyanate-terminated polyurethane prepolymer of an acid value of >44 mg KOH/g; with an organic polyisocyanate component (70% by weight being aliphatic) and an organic poly (isocyanate-reactive group) component (with hydroxyl, imino or thiol groups and an acid group to provide anionic groups for water-dispersibility). These reactants are present in amounts so the ratio of NCO to NCO-reactive groups is from 1.4/1 to 2.9/1. The resultant urethane-acrylate copolymer dispersions have a relatively low polyurethane content.

U.S. Pat. No. 6,566,438 (SKW Bauchemie) describes a PUD/polymer hybrid dispersion that forms hard films. The hybrid is prepared from (% by weight of total (A) to (G)): (A) 3 to 25% polyol; (B) 2 to 20% polyisocyanate (C) 0 to 6% solvent; (D) 0.15 to 1.5% neutraliser; (E) 0.1 to 1% chain extender (F) 5 to 40% monomer; and (G) 0.01 to 1.5% free-radical initiator. Ingredients (A) to (C) form a polyurethane prepolymer which is neutralised with (D) then chain extended with (E) to form a PUD. The hybrid dispersion is prepared by adding the PUD into a mixture of (F) and (G) and allowing (F) to undergo free-radical polymerization within the micelles of the PUD. These polyurethane-acrylate copolymer dispersions have a relatively high urethane content.

WO 1997-049747 (PPG) describes aqueous dispersions of urethane polymers and vinyl polymers.

WO2012-084973 (DSM) describes vinyl oligomer/polymer compositions that may be obtained from a bio-based monomer source such as an itaconate.

WO2012-084977 (DSM) describes vinyl beads that may be obtained from a bio-based monomer source such as an itaconate.

The applicant has now surprisingly found that improved urethane acrylates can be prepared by copolymerizing a polyurethane with biorenewable monomers and/or itaconate (and/or related) monomer in the polyvinyl phase. The urethane acrylates obtained from itaconate monomers may also be referred to as urethane itaconates. Urethane itaconates of the invention may be prepared with low amounts of VOC and can exhibit excellent chemical resistance (especially to water and/or ethanol).

It is an preferred object of the present invention provide aqueous (and preferably at least partially biorenewable) urethane-acrylates and/or urethane itaconates that address some or all of the problems described herein. For example they may be prepared from preferably a high proportion of bio-renewable olefinically unsaturated monomers; may form coating films at room temperature (standard conditions) with low (or preferably no) amounts of film forming assistants; and/or may have a low level of residual monomer and/or VOC. A more preferred object of the invention provides urethane-acrylate coating films having high elasticity and/or good block resistance.

Therefore broadly in accordance with one aspect of the present invention there is provided an aqueous copolymer composition comprising a) from 10 to 95 wt-% of a polyurethane copolymer, and
b) from 5 to 90 wt-% of a polyvinyl copolymer comprising from 30 parts to 100 parts by weight (total of (i) and (ii) together) per 100 parts by weight of the polyvinyl copolymer of
  (i) one or more biorenewable monomer(s) and/or
  (ii) one or more $C_{4-6}$ unsaturated diacid monomers and/or derivatives thereof (usefully itaconate functional monomer(s));

where the aqueous copolymer composition has a residual monomer level of less than 5000 ppm.

In another aspect of the invention there is provided an aqueous copolymer composition comprising a) from 10 to 95 wt-% of a polyurethane copolymer, and b) from 5 to 90 wt-% of a polyvinyl copolymer obtained and/or obtainable from polymerising a monomer composition comprising from 30 parts to 100 parts by weight of at least one monomer comprising $C_{4-6}$unsaturated diacid(s) and/or derivative(s) thereof per 100 parts by weight of the monomer composition, where at least one of the $C_{4-6}$unsaturated diacid(s) and/or derivative(s) thereof comprise an amount of carbon-14 sufficient to produce a decay of at least about 1.5 dpm/gC (disintegrations per minute per gram carbon) (optionally which amount of $C^{14}$ can be considered to denote a material as biorenewable as used herein) and where the polyvinyl copolymer (and/or the aqueous copolymer composition) has a residual monomer level of less than 5000 ppm as determined by GCMS (as described herein).

The $C_{4-6}$unsaturated diacid(s) and/or derivatives thereof that form whole or part of the monomer composition in step (b) may comprise at least one mono-ethylenically unsaturated dicarboxylic acid(s) having from 4 to 6 carbon atoms in the acidic moiety and/or derivative(s) thereof, preferably at least one pentendioic acid(s) and/or derivative(s) thereof, more preferably at least one itaconate functional monomer (s) (as defined herein), even more preferably at least one itaconate diester(s) and/or itaconate diamide(s), most preferably at least one itaconate di(alkyl) ester, usefully at least one di($C_{1-3}$alkyl) itaconate, more usefully dimethyl itaconate (DMI) and/or conveniently at least one di($C_{4-10}$alkyl) itaconate, more conveniently ibutyl itaconate (DBI).

Preferably the polyvinyl copolymer (b) has a residual level of itaconate functional monomer less than 5000 ppm as determined by GCMS (as described herein).

Further features and aspects of the invention are defined in the claims.

Copolymer Composition
Amount of Polyurethane (PU) (a)

The aqueous copolymer composition of the invention comprises an amount of the polyurethane copolymer (a) by weight of at least 10%, preferably at least 15%, more preferably at least 20%, even more preferably at least 30%, most preferably at least 40%, for example about 50%.

The aqueous copolymer composition of the invention comprises an amount of the polyurethane copolymer (a) by weight of no more than 95%, preferably no more than 85%, more preferably no more than 80%, even more preferably no more than 65%, most preferably no more than 55%, for example about 50%.

The aqueous copolymer composition of the invention comprises an amount of the polyurethane copolymer (a) by weight of from 10 to 95%, preferably from 15 to 85%, more preferably from 20 to 80%, even more preferably at least from 30 to 65%, most preferably from 40 to 55%, for example about 50%.

Amount of Polyvinyl Copolymer (b)

The aqueous copolymer composition of the invention comprises an amount of the polyvinyl copolymer (b) by weight of at least 5%, preferably at least 10%, more preferably at least 20%, even more preferably at least 30%, most preferably at least 40%, for example about 50%.

The aqueous copolymer composition of the invention comprises an amount of the polyvinyl copolymer (b) by weight of no more than 90%, preferably no more than 85%, more preferably no more than 80%, even more preferably no more than 70%, most preferably no more than 60%, for example about 50%.

The aqueous copolymer composition of the invention comprises an amount of the polyvinyl copolymer (b) by weight of from 5 to 90%, preferably from 10 to 85%, more preferably from 20 to 80%, even more preferably at least from 30 to 70%, most preferably from 40 to 60%, for example about 50%.

All percentages by weight given above are calculated for polyurethane (a) and polyvinyl copolymer (b) based on the sum of the amount of polyurethane copolymer (a) and the polyvinyl copolymer (b) being equal to 100%.

In a useful embodiment of the invention the respective weight ratio of the urethane component (a) to the polyvinyl component (b) in the compositions of the invention may be from 10-90 to 95-5, more usefully from 15-85 to 70-30, and most usefully from 20-80 to 50-50.

Polyvinyl Copolymer Components—(b)(ii)—Itaconate and Related Monomers

The component (b)(ii) the one or more $C_{4-6}$unsaturated diacid monomers and/or derivatives thereof (such as an itaconate monomer) may be obtained from any suitable sources or mixture of different sources such as a fossil fuel source and/or a biorenewable source.

In one alternative embodiment of the invention the component (b)(ii) comprises one or more $C_{4-6}$unsaturated diacid monomers and/or derivatives thereof (such as an itaconate monomer) obtained from a fossil fuel source. In this embodiment optionally there is no biorenewable component (i).

However in another preferred embodiment of the invention if the component (b)(ii) is obtained in whole or in part from a biorenewable source that that part of (b)(ii) which is biorenewable may also be considered to also comprise the biorenewable monomer (b)(i) and optionally there is no need for an additional a separate component (b)(i).

More preferably the component (b)(ii) is entirely obtained from a biorenewable source in which case most preferably in component (b) the biorenewable monomer (i) and $C_{4-6}$unsaturated diacid monomers and/or derivatives (ii) can be considered to be the same component.

More preferably (b) (i) and (b) (ii) together consist of one or more mono-ethylenically unsaturated dicarboxylic acid monomer(s) having from 4 to 6 carbon atoms (also referred to herein as $C_{4-6}$unsaturated diacid monomers) and/or derivatives thereof, more preferably one of more itaconate functional monomer(s).

It will be appreciated that for derivatives of $C_{4-6}$unsaturated diacid monomers the number of carbon atoms referred to herein, denote those in the hydrocarbocarbonyl moiet(ies) derived and/or derivable from carbonyl acidic moiet(ies). For example (unless the context clearly indicated otherwise) where the derivative is an ester the number of carbon atoms specified herein excludes those carbon atoms in alkoxy moiet(ies) derived and/or derivable from an alcohol.

Unless the context clearly indicates otherwise the weight percentages given herein from components (a) and (b) are calculated based on the total of components (a) and (b) being 100%, and for this calculation any other ingredients that may be included in the aqueous copolymer composition are discounted.

In any aspect of the invention, where the polyvinyl copolymer (b) (i) and/or (b)(ii) comprises one or more monomer(s) selected from $C_{4-6}$unsaturated diacids and/or derivatives thereof, preferably such monomer(s) comprise one or more itaconate functional monomers, more preferably one or more dialkyl esters and/or diamides of itaconic acid; even more preferably one or more di($C_{1-10}$alkyl) itaconates, most preferably one or more di($C_{1-6}$alkyl) itaconates, for example dibutyl itaconate (DBI). Usefully all such monomers may be obtained from a biorenewable source in which case more usefully components (b) (i) and (b) (ii) are the same.

Preferably the polyvinyl copolymer (b) comprises from 35 to 100 parts by weight, more preferably from 40 to 100 parts by weight, even more preferably from 50 to 100 parts by weight, and most preferably from 50 to 90 parts by weight of biorenewable monomers (i), calculated with respect to the total amount of polyvinyl copolymer (b) in the compositions of the invention being 100 parts by weight.

Preferably the polyvinyl copolymer (b) comprises from 35 to 100 parts by weight, more preferably from 40 to 100 parts by weight, even more preferably from 50 to 100 parts by weight, and most preferably from 50 to 90 parts by weight of monomers (ii) $C_{4-6}$unsaturated diacids and/or derivatives thereof from any source or mixture of sources, more preferably itaconate functional monomers, calculated with respect to the total amount of polyvinyl copolymer (b) in the compositions of the invention being 100 parts by weight.

In component (b) (ii) the proportions by weight of the monomer which is biorenewable material to that which is non-biorenewable material (e.g. from a fossil fuel source) based on the sum of biorenewable and non-biorenewable material in component (b)(ii) being equal to 100 parts by weight may be as follows:
from 0 to 100 parts by weight biorenewable and from 100 to 0 parts by weight non-biorenewable;
conveniently from 10 to 100 parts by weight biorenewable and from 90 to 0 parts by weight non-biorenewable;
more conveniently from 30 to 100 parts by weight biorenewable and from 70 to 0 parts by weight non-biorenewable;
even more conveniently from 50 to 100 parts by weight biorenewable and from 50 to 0 parts by weight non-biorenewable;
most conveniently from 70 to 100 parts by weight biorenewable and from 30 to 0 parts by weight non-biorenewable;
especially most conveniently from 90 to 100 parts by weight biorenewable and from 10 to 0 parts by weight non-biorenewable; and
for example 100 parts by weight biorenewable and 0 parts by weight non-biorenewable.

Usefully where the component (b)(ii) comprises at least some or all of material from a biorenewable source then the polyvinyl copolymer (b) may comprise a total amount of (i) and (ii) together from 35 to 100 parts by weight, more preferably from 40 to 100 parts by weight, even more preferably from 50 to 100 parts by weight, and most preferably from 50 to 90 parts by weight of biorenewable $C_{4-6}$unsaturated diacids and/or derivatives thereof, more preferably biorenewable itaconate functional monomers, calculated with respect to the total amount of polyvinyl copolymer (b) in the compositions of the invention being 100 parts by weight.

In a preferred embodiment of any aspect of the invention the polyvinyl copolymer (b) comprises from 30 to 90 parts by weight of dibutyl itaconate (DBI) calculated with respect to the total amount of polyvinyl copolymer (b)) in the compositions of the invention being 100 parts by weight.

In any aspect of the invention preferably the polyurethane copolymer (a) comprises from 10 to 100 parts by weight, more preferably from 20 to 100 parts by weight, even more preferably from 30 to 100 parts by weight, most preferably from 50 to 100 parts by weight, for example 50 to 90 parts by weight of biorenewable monomers, calculated with respect to the total amount of polyurethane copolymer (a) in the compositions of the invention being 100 parts by weight.

Polyvinyl Copolymer Components—(b)(i)—Bio-Renewable Monomers

Bio-renewable monomers may be obtained fully or in part (preferably fully) from bio-renewable sources. Thus it is preferred to also measure the carbon-14 content to determine the biorenewability.

The content of carbon-14 (C-14 or $^{14}C$) is indicative of the age of a bio-based material. It is known in the art that C-14, which has a half-life of about 5,700 years, is found in bio-renewable materials but not in fossil fuels. Thus, "biorenewable materials" refer to organic materials in which the carbon comes from non-fossil biological sources. Examples of bio-renewable materials include, but are not limited to, sugars, starches, corns, natural fibres, sugarcanes, beets, citrus fruits, woody plants, cellulosics, lignocelluosics, hemicelluloses, potatoes, plant oils, other polysaccharides such as pectin, chitin, levan, and pullulan, and a combination thereof.

The term biorenewable materials as used herein preferably means materials where the level of carbon-14 (14C) isotopes in the material is comparable to the mean level of 14C in atmospheric $CO_2$ (e.g. as measured by ASTM D6866). Comparable as used herein means the value is within +/−6% of the value of the reference sample (described herein or in the standard test method used), more preferably within +/−5%, most preferably within +/−4%.

The percentage differences for comparable properties herein refer to fractional differences between the material tested and the reference where the property is measured in the same units in the same way (i.e. if the value to be compared is also measured as a percentage it does not denote an absolute difference).

More preferred biorenewable materials are those comprising a minimum amount of the C-14 isotope such that the C-14 level in the material satisfies one or more of the values as described herein.

C-14 levels can be determined by measuring its decay process (disintegrations per minute per gram carbon or dpm/gC) through liquid scintillation counting. In one embodiment of the present invention, polymer A and or polymer B comprise at least about 1.5 dpm/gC (disintegrations per minute per gram carbon) of carbon-14, more preferably at least 2 dpm/gC, most preferably at least 2.5 dpm/gC, and especially at least 4 dpm/gC.

In addition to itaconate and related monomers obtained from a biorenewable source and described in relation to component (b)(ii) optionally other biorenewable components may be used to prepare any of the polymers herein for example poly vinyl copolymer (b) and thus may comprise component (b)(i).

Examples of bio-renewable monomers include but are not limited to bio-based (meth)acrylics obtained by for example using bio-derived alcohols such as bio-ethanol or bio-butanol and include (meth)acrylic acid and alkyl (meth)acrylate, where alkyl is preferably selected from methyl, ethyl, butyl or 2-ethylhexyl.

Acrylic acid can be made from glycerol, as is disclosed by Arkema, or from lactic acid as described by U.S. Pat. No. 7,687,661. Methacrylic acid can be prepared from ethene, methanol and carbon monoxide (all potentially bio-renewable), as disclosed by Lucite International Ltd.

Olefinically unsaturated bio-renewable monomers which may be used to prepare polymers of the inventionany which may provide a contribution to their improved properties include α-methylene butyrolactone, α-methylene valerolactone, α-methylene γ-$R^1$ butyrolactone ($R^1$ can be an optionally substituted alkyl or optionally substituted aryl); itaconates such as dialkyl itaconates and monoalkyl itaconates, itaconic acid, itaconic anhydride, crotonic acid and alkyl esters thereof, citraconic acid and alkyl esters thereof, methylene malonic acid and its mono and dialkyl esters, citraconic anhydride, mesaconic acid and alkyl esters thereof.

Another useful set of useful bio-renewable monomers include N—$R^2$, α-methylene butyrolactam ($R^2$ can be an optionally substituted alkyl or optionally substituted aryl); N—$R^2$, α-methylene γ-$R^1$ butyrolactam; N-alkyl itaconimids; itaconmonoamids; itacondiamids; dialkyl itaconamides, mono alkyl itaconamides; furfuryl (meth)acrylate; fatty acid functional (meth)acrylates such as DAPRO FX-522 from Elementis and Visiomer® MUMA from Evonik.

Derivatives of the $C_{4-6}$monounsaturated diacids referred to herein may comprise any suitable isomers (such as E and Z geometric isomers); anhydrides, monoesters, diesters, monoamides, diamides and/or combinations and mixtures thereof. Preferred are $C_{5-6}$mono-unsaturated diacids and/or derivatives thereof, more preferred are $C_5$mono-unsaturated diacids and/or derivatives thereof, most preferred are itaconate functional monomers.

Examples of suitable mono unsaturated diacids of formula $C_4H_4O_4$ comprise:
fumaric acid

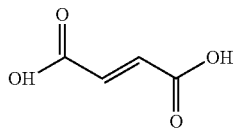

and maleic acid

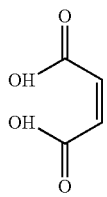

Examples of suitable mono unsaturated diacids of formula $C_5H_6O_4$ comprise:
itaconic acid

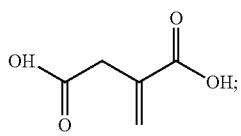

citraconic acid

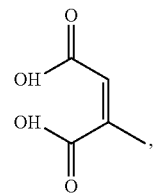

glutaconic acid

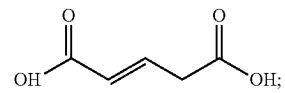

and
mesaconic acid

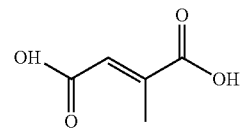

Itaconate Functional Monomers

The term itaconate functional monomer denotes itaconic acid and/or suitable derivatives thereof. Conveniently itaconate functional monomer(s) may for example comprise one or more of those compounds represented generally by Formula 1:

Formula 1

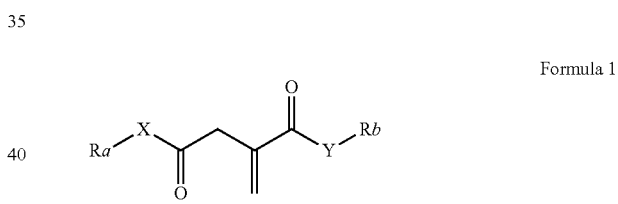

where Ra and Rb independently represent H and/or any optionally substituted hydrocarbo moiety, for example optionally substituted $C_{1-30}$ hydrocarbo (such as any aliphatic, cycloaliphatic or aromatic moieties); and X and Y independently represent —O— and/or —NRc-, where Rc independently in each case represents H and/or any optionally substituted hydrocarbo moiety for example optionally substituted $C_{1-30}$ hydrocarbo (such as any aliphatic, cycloaliphatic or aromatic moieties).

When X and Y are both O, and Ra and Rb are both other than H, then Formula 1 represents itaconate diesters (and for example when Ra and Rb are both independently alkyl, Formula 1 represents dialkyl itaconate esters).

When X and Y are both O, and one of Ra and Rb is other than H, then Formula 1 represents itaconate monoesters (also known as itaconate half esters).

When X and Y are both O and Ra and Rb are both H then Formula 1 represents itaconic acid.

When X and Y are both NRc, then Formula 1 represents itaconic diamides (and for example when Ra, Rb and Rc are each independently alkyl Formula 1 represents itaconic di(N-dialkyl)amides).

When X is O, Ra is other than H and Y is NRc, then Formula 1 represents an itaconate mono ester mono amide.

When X is O, Ra is H and Y is NRc, then Formula 1 represents itaconamic acid when Rb and Rc are both H or N-subsituted derivatives of itaconamic acid (when at least one of Rb and Rc are other than H).

Itaconic functional monomers of Formula 1 may also represent compounds when X and Y are the same moiety in which case Ra and Rb are superfluous as Formula 1 represents those compounds comprising a five membered ring as represented by Formula 1A:

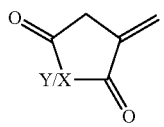

Formula 1A for example when X/Y represents O then Formula 1A represents itaconic anhydride and for example when X/Y represent NRc then Formula 1A represents N-substituted itaconimids, where Rc represents H, or an C1-20alkyl, C3-20aryl or C4-20alkylaryl group.

Itaconate functional monomers may also usefully be divided into different (mutually exclusive) types such as higher itaconate monomers, lower itaconate monomers and/or itaconate acid monomers (each of which is defined below).

Other $C_{4-6}$monounsaturated diacids (and derivatives thereof analogous to those represented herein by the itaconate functional monomers of Formulae 1 and 1A) may also be used as component (b) (ii) [and/or (b) (i)] to prepare the polyvinyl component of the copolymers of the present invention. Such components may include citraconic, glutaconic and/or mesaconic acids and/or their analogous derivatives in additional to or instead of an itaconate functional monomer.

In one embodiment preferred itaconate functional monomers are selected from higher itaconate monomers and/or itaconic acid monomers, more preferably comprise higher itaconate monomers, most preferably $C_{4-6}$dialkyl itaconates, for example DBI.

Higher Itaconate Monomers

In one embodiment of the present invention the vinyl polymer (b) may usefully comprise one or more higher itaconate monomers (as whole or part of the itaconate functional monomer(s)) and such monomers are typically hydrophobic. Higher itaconate monomers may be represented by Formula 1B

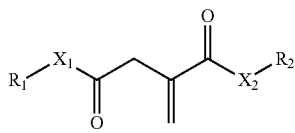

Formula 1B where both $R_1$ and $R_2$ independently represent an optionally substituted hydrocarbo moiety having from 4 to 10, preferably from 4 to 8, more preferably from 4 to 6, most preferably 4 carbon atoms; and
$X_1$ and $X_2$ independently represent O or $NR_5$ where $R_5$ denotes H or an optionally substituted hydrocarbo moiety having from 1 to 6 carbon atoms; preferably $C_{1-4}$alkyl; more preferably $C_{1-3}$alkyl; preferably $X_1$ and $X_2$ independently represent O, or NH, more preferably O.

Whilst $X_1$ and $X_2$ may be different, more conveniently they represent identical moieties.

Usefully $R_1$ and $R_2$ may independently represent optionally substituted $C_{4-10}$alkyl and/or $C_{4-10}$aryl, more usefully $C_{4-8}$alkyl and/or $C_{4-8}$aryl and most usefully $C_{4-6}$alkyl, even more usefully butyl (n-butyl being especially useful).

Whilst $R_1$ and $R_2$ may be different, more conveniently they represent identical moieties. Especially preferred examples of Formula 1 include those where $R_1$ and $R_2$ are identical, such di(benzyl)itaconate, di(phenyl)itaconate, di-n-butyl itaconate, di-1-butyl itaconate, and/or di-2-ethyl hexyl itaconate. Where $R_1$ and $R_2$ both represent n-butyl Formula 1A represents dibutyl 2-methylidenebutanedioate (also referred to herein as di(n-butyl)itaconate or DBI) which has the following structure:

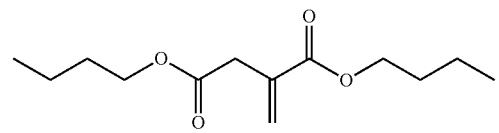 [SMILES: C=C(CC(=O)OCCCC)C(=O)OCCCC]

DBI is the most preferred monomer for use in this particular embodiment.

Itaconic Acid Monomers

Itaconic acid monomers refers to both itaconic acid and its isomers but also precursors for them that are potential itaconic acid monomers such as any itaconic acid derivatives or itaconic acid isomers derivatives (such anhydrides and/or monoacid half esters) that comprise (or under the conditions of reaction herein produce) carboxylic acid groups. Preferred itaconic acid monomers (where present) may comprise: itaconic acid, itaconic anhydride, citraconic acid, citraconic anhydride, glutaconic acid, glutaconic anhydride, mesaconic acid, mesaconic anhydride and/or mixtures thereof; more preferably itaconic acid, itaconic anhydride, citraconic acid, citraconic anhydride and/or mixtures thereof, most preferably itaconic acid and/or itaconic anhydride.

Conveniently Itaconic acid monomers may be used in a total amount (optionally in combination with other well-known vinyl acidic monomers that are not itaconic acid monomers as defined herein) sufficient that the resultant polyvinyl copolymer (b) has an acid value (AV) of less than 35 mg KOH per g of solid polyvinyl copolymer (b), preferably <15 mg KOH per g, more preferably from <5 mg KOH per g, and most preferably 0 mg KOH per g.

If any other acid monomers in addition to those itaconic acid monomers described above are present in polymer (b) these can be selected any well known to those skilled in the art such as any of the following:

Other unsaturated carboxylic acids—including acrylic acid, methacrylic acid, beta carboxy ethyl acrylate, fumaric acid, crotonic acid, Other unsaturated potentially acidic monomers—including maleic anhydride, and unsaturated phosphate or phosphonate monomers—including phosphated ethyl (meth)acrylate, phosphated butyl (meth)acrylate, or phosphated polyethyl or polypropyl glycol (meth)acrylate—, and unsaturated sulphate or sulphonate functional monomers—including AMPS and styrene sulphonate.

In one embodiment all the acid monomers used to prepare the polyvinyl copolymer (b) are biorenewable, preferably are all itaconic acid monomers as described herein.

Usefully the polyvinyl copolymer (b) satisfies both the acid value (AV) and weight limits herein, but it will be appreciated that depending on the monomer used the AV specified herein may be achieved using weight percentages outside those preferred wt-% values given herein. Where there is an apparent inconsistency herein between any weight % of monomer or other component and the acid values specified it will be appreciated that satisfying the AV is generally the more desirable objective. If necessary the values for weight % of the relevant ingredients can be modified appropriately in a manner well known to a skilled person.

Lower Itaconate Monomers

In one embodiment of the present invention the vinyl polymer (b) may usefully comprise one or more lower itaconate monomers (as whole or part of the itaconate functional monomer(s)). Where lower itaconate monomers are present, preferably they may comprise one or more lower itaconate diester(s). i.e. compounds of Formula 1 where X and Y are O and Ra and Rb are independently optionally substituted $C_{1-3}$hydrocarbo groups (such as $C_{1-3}$alkyl). An example of a lower itaconate diester is dimethyl itaconate (DMI).

Lower itaconate monomers may be represented by Formula 1C

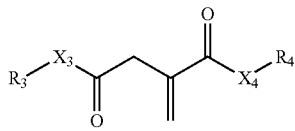

Formula 1C where $R_3$ and $R_4$ independently represent an optionally substituted hydrocarbo moiety having from 1 to 3 carbon atoms; preferably optionally substituted $C_{1-3}$hydrocarbyl, more preferably $C_{1-3}$alkyl;

$X_3$ and $X_4$ independently represent O or $NR_5$ where $R_5$ denotes H or an optionally substituted hydrocarbo moiety having from 1 to 6 carbon atoms; preferably $C_{1-4}$alkyl; more preferably $C_{1-3}$alkyl; preferably $X_3$ and $X_4$ independently represent O, or NH, more preferably O.

Whilst $X_3$ and $X_4$ may be different, more conveniently they represent identical moieties.

Whilst $R_3$ and $R_4$ may be different, more conveniently they represent identical moieties.

Other useful biorenewable monomers which may be the same or different to those already described may be selected from any of the following and/or mixtures thereof, aliphatically functionalized methylene functional cyclic lactones or lactams, and methylidene dialkyl malonates.

(Meth)acrylic esters from biorenewable resources, including partially biobased (meth)acrylate monomers where the alkyl ester group is obtained from biorenewable sources, while the (meth)acrylic acid group may be made from fossil fuel sources.

Any of the aforementioned itaconate functional monomers are preferably biobased, but can also be obtained from fossil fuel.

One or more of the monomers not described above may also comprise the vinyl copolymer (b) in either aspect of the invention i.e. such "other monomers" are other than a biorenewable monomer or a $C_{4-6}$unsaturated diacid monomer or derivative thereof (e.g. itaconate functional monomer).

Preferred "other monomers" may be one or more of those described below:

(meth)acrylate monomers having ester groups with 1 to 20, more preferred between 1 and 12, most preferred between 1 and 6 carbon atoms, vinyl aromatic monomers, such as styrene, and alpha-methyl styrene, multifunctional unsaturated monomers, including di-, tri- and tetra-functional (meth)acrylates and divinyl benzene.

monomers having crosslinking functionality (cross-linkers) and/or monomers having adhesion promoting groups thereon (adhesion promoters).

In any aspect of the invention preferably the polyvinyl copolymer (b) comprises from a trace amount to 15 parts by weight, more preferably from 1 to 10 parts by weight, and most preferably from 2.5 to 8.5 parts by weight of cross-linkable monomers, calculated with respect to the total amount of polyvinyl copolymer (b) in the compositions of the invention being 100 parts by weight.

As used herein "trace amount" indicates that a component is present in a non zero amount just above the lower limits of detection by conventional analytical techniques well known to those skilled in the art.

Typical crosslinking monomers are diacetone acrylamide (in combination with polyhydrazides, polyhydrazines, poly-semi-carbazides), acetoacetoxy ethyl methacrylate (in combination with polyamines, or polyhydrazides), glycidyl (meth)acrylates (in combination with polyamines), and hydroxyalkyl (meth)acrylate (such as 2-hydroxyethyl (meth)acrylate, 2-hydroxypropyl (meth)acrylate, or 4-hydroxybutyl (meth)acrylate (in combination with polyisocyanates). It is also possible to copolymerize fatty acid functional monomers, such as Visiomer MUMA (ex. Evonik) or Dapro Serad 521 and 522 (ex. Elementis) or other oxidatively curing monomers such as esters of geranic acid and hydroxyl functional (meth)acrylates.

Silane functional crosslinking monomers may be those having an unsaturated (meth)acrylate or vinyl group and an alkoxy silane group. Typical examples include 3-methacryloxypropyltrimethoxysilane [CAS #: 2530-85-0], Methacryloxytrimethoxysilane [CAS #: 13688-56-7], Methacryloxypropyltris(trimethylsiloxy)silane [CAS #: 17096-07-0], 3-methacryloxypropyltriethoxysilane [CAS #: 21142-29-0], 3-methacryloxypropylmethyldimethoxysilane [CAS #: 14513-34-9], 3-methacryloxypropylmethyldiethoxysilane [CAS #: 65100-04-1], Methacryloxymethyltrimethoxysilane [CAS #: 54586-78-6], Methacryloxymethyltriethoxysilane [CAS #: 5577-72-0], Methacryloxymethyl(methyl)dimethoxysilane [CAS #: 121177-93-3], Methacryloxymethyl(methyl)diethoxysilane [CAS #: 3978-58-3], 3-Acryloxypropyltrimethoxysilane [CAS #: 4369-14-6].

Preferred crosslinking functionality that may be introduced to the polyurethane (a) include Schiff-base crosslinking and/or silane crosslinking.

By Schiff base crosslinking is meant that crosslinking takes place by the reaction of a carbonyl functional group(s) with an activated amine or hydrazine group By a carbonyl functional group herein is meant an aldo or keto group and includes an enolic carbonyl group such as is found in an acetoacetyl group with a carbonyl-reactive amine or hydrazine (or blocked amine or hydrazine) functional group.

By silane crosslinking is meant that crosslinking results from the condensation reaction of silanol groups. Such silanol groups usually originate from the hydrolysis of alkoxysilane functionality.

Typically, a crosslinking polyurethane would comprise one of the above mentioned crosslinking functionalities.

However, combining two or more crosslinking functionalities in one polyurethane, or combining two or more polyurethanes each comprising a type of crosslinking functionality, is also considered as part of this invention.

Elegantly, combining multiple crosslinking funcitonalities in one or more polyurethane(s) can be accomplished by using multiple types of polyhydroxy compounds, hereinafter conveniently referred to as 'polyol', in the synthesis of polyurethane oligomer(s).

In the case of Schiff-base crosslinking the crosslinkable polyurethane oligomer(s) comprises keto functional and/or acetoacetoxy functional polyol(s). Preferably this polyol is a polyester or an alkyd, more preferably a polyester.

Preferably keto or acetoacetoxy functionality is introduced via copolymerisation of levulinic acid [CAS #: 123-76-2] or acetoacetic acid [CAS #: 541-50-4].

Preferably the polyol contains between 0.5 and 50 wt-% on total mass of polyol of levulinic acid or acetoacetic acid, more preferred between 10 and 40 wt-%, and typically between 15 and 30 wt-% on total mass of polyol.

The keto and/or acetoacetoxy functionalities can be crosslinked using the same polyamines, polyhydrazines, polyhydrazides, and/or polysemicarbazides as discussed in the polyvinyl section.

In the case of silane crosslinking the crosslinkable polyurethane oligomer(s) comprises alkoxysilane groups. These can be introduced via a polyamide, polyester, or alkyd comprising silane functional group(s) and/or via reaction of isocyanatopropyl trimethoxysilane [CAS #: 15396-00-6], and/or via the reaction during the synthesis of the polyurethane of both polyamide, polyester, or alkyds comprising alkoxysilane groups and isocyanatopropyl trimethoxysilane.

Typical alkoxysilane groups that can be used in the synthesis of a polyamide, polyester or alkyd include conveniently those silanes that comprise one or more silo groups and one or more $C_{1-10}$ hydrocarbo groups optionally substituted with one or more $—NH_2$, $—NH(C_{1-10}$hydrocarbo, $—SH$ and/or $—S(C_{1-10}$hydrocarbo)) and/or $C_{1-6}$hydrocarbyloxy groups.

More convenient silanes are those that comprise one to three silyl groups each optionally substituted by one to four groups selected from: $C_{1-10}$hydrocarbylene (substituted with one or more $—NH_2$, $—NH(C_{1-6}$alkyl) and/or $—SH$) and/or $C_{1-6}$alkoxy.

Most convenient silanes are those that comprise one to two silyl groups each substituted by two to four groups selected from: $C_{1-10}$alkylene (substituted with one to two $—NH_2$, $—NH(C_{1-6}$alkyl) and/or $—SH$) and/or $C_{1-6}$alkoxy.

Suitable silanes can comprise primary amine, secondary amine, thiol and/or hydroxyl functional groups, preferably primary and/or secondary amines and/or thiols, for example primary and/or secondary amines.

Suitable silanes comprise a plurality of alkoxy groups, preferably two or more
$C_{1-4}$alkoxy groups, more preferably two or three methoxy and/or ethoxy groups.

Other examples of suitable aminosilanes include, 3-aminopropyltrimethoxysilane, 3-aminopropyltriethoxysilane, 3-aminopropylmethyldimethoxysilane, 3-aminopropylmethyldiethoxysilane, 3-aminopropylethyldiethoxysilane, 3-aminopropyldimethylethoxysilane, 3-aminopropyldiisopropylethoxysilane, 3-aminopropyltripropoxysilane, 3-aminopropyltributoxysilane, 3-aminopropylphenyldiethoxysilane, 3-aminopropylphenyldimethoxysilane, 3-aminopropyltris(methoxyethoxyethoxy)silane, 2-aminoisopropyltrimethoxysilane, 4-aminobutyltrimethoxysilane, 4-aminobutyltriethoxysilane, 4-aminobutylmethyldimethoxysilane, 4-aminobutylmethyldiethoxysilane, 4-aminobutylethyldimethoxysilane, 4-aminobutylethyldiethoxysilane, 4-aminobutyldimethylmethoxysilane, 4-aminobutylphenyldimethoxysilane, 4-amino-butylphenyldiethoxysilane, 4-amino(3-methylbutyl)methyldimethoxysilane, 4-amino(3-methylbutyl)methyldiethoxysilane, 4-amino(3-methylbutyl)trimethoxysilane, 3-aminopropylphenylmethyl-n-propoxysilane, 3-aminopropylmethyldibutoxysilane, 3-aminopropyldiethylmethylsilane, 3-aminopropylmethylbis(trimethylsiloxy)silane, 11-aminoundecyltrimethoxysilane, N-methyl-3-aminopropyltriethoxysilane, N-(n-butyl)-3-aminopropyltrimethoxysilane, N-(2-aminoethyl)-3-aminopropyltrimethoxysilane, N-(2-aminoethyl)-3-aminoisobutylmethyldimethoxysilane, N-(2-aminoethyl)-3-aminopropylmethyldimethoxysilane, N-(2-aminoethyl)-3-aminopropyltris(2-ethylhexoxy)silane, N-(6-aminohexyl)-3-aminopropyltrimethoxysilane, N-benzyl-N-(2-aminoethyl)-3-aminopropyltrimethoxysilane, bis(3-trimethoxysilylpropyl)amine, bis(3-triethoxysilylpropyl)amine, (aminoethylaminomethyl)phenethyltrimethoxysilane, 3-(m-amino-phenoxy)propyltrimethoxysilane, m- and/or p-aminophenyltrimethoxysilane, 3-(3-aminopropoxy)-3,3-dimethyl-1-propenyltrimethoxysilane, 3-aminopropylmethylbis(trimethylsiloxy)silane, 3-aminopropyltris(trimethylsiloxy)silane, 3-aminopropylpentamethyldisiloxane, N,N-bis-(3-trialkoxysilylpropyl)-amine or any desired mixture of such aminosilanes.

Specific examples of mercaptane or epoxy functional comprise: Mercaptopropyl trimethoxysilane [CAS #: 4420-74-0], Mercaptopropyl triethoxysilane [CAS #: 14814-09-6], Mercaptopropyl methyldimethoxysilane [CAS #: 31001-77-1], 3-glycidoxypropyl trimethoxysilane [CAS #: 2530-83-8], 3-glycidoxypropyl triethoxysilane [CAS #: 2602-34-8], 3-glycidoxypropyl methyldiethoxysilane [CAS #: 2897-60-1], 3-glycidoxypropyl methyldimethoxysilane [CAS #: 65799-47-5], 2-(3,4-epoxycyclohexyl)-ethyl trimethoxysilane [CAS #: 3388-04-3], 2-(3,4-epoxycyclohexyl)-ethyl triethoxysilane [CAS #: 10217-34-2].

Polymers of the invention may also comprise monomers that improve (wet) adhesion properties. Typical monomers include ureido functional monomers, such as Plex 6852-O (ex. Evonik), i-bornyl (meth)acrylate, polyethylene (meth)acrylate, polypropylene (meth)acrylate.

Preferably, the adhesion promoting monomer(s) is used in concentrations of less than 15 wt-%, more preferably less than 10 wt-%, and most preferably between 0 and 10 wt-%.

Optionally such adhesion promoting monomers may also comprise least one polymer precursor(s) of Formula 3

Formula 2

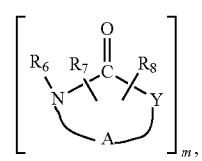

where Y denotes an electronegative group,
$R_6$ is H, OH or an optionally hydroxy substituted $C_{1-10}$hydrocarbo
$R_7$ is H or a $C_{1-10}$hydrocarbo;
$R_8$ is a $C_{1-10}$hydrocarbo group substituted by at least one activated unsaturated moiety; and; either:
A represents a divalent organo moiety attached to both the —HN— and —Y— moieties so the -A-, —NH—, —C(=O)— and —Y— moieties together represent a ring of 4 to 8 ring atoms, and $R_7$ and $R_8$ are attached to any suitable point on the ring; or
A is not present (and Formula 3 represents a linear and/or branched moiety that does not comprise a heterocyclic ring) in which case $R_7$ and $R_8$ are attached to $R_6$; and
m is an integer from 1 to 4.

The ring moiet(ies) of Formula 2 are each attached to $R_8$ and in Formula 2 when m is 2, 3 or 4 then $R_8$ is multi-valent (depending on the value of m). If m is not 1 $R_7$ and —Y— may respectively denote the same or different moieties in each ring, preferably the same respective moieties in each ring. $R_7$ and $R_8$ may be attached at any suitable position on the ring.

Preferred monomers of Formula 2 comprise, conveniently consist essentially of, those where: A represents an optional substituted divalent $C_{1-5}$hydrocarbylene; and
—Y— is divalent —$NR_9$— (where $R_9$ is H, OH, optionally hydroxy substituted $C_{1-10}$hydrocarbo or $R_8$) or divalent O, More preferred monomers of Formula 2 comprise those where: m is 1 or 2
—Y— is —$NR_8$— (i.e. where Formula 2 is attached to $R_8$ via a ring nitrogen), A represents a divalent $C_{1-3}$hydrocarbylene; $R_6$ is H, $R_7$ is a $C_{1-10}$hydrocarbo; and
$R_8$ comprises a (meth)acryloxyhydrocarbo group or derivative thereof (e.g. maleic anhydride).

Monomers represented by Formula 2 include some monomers informally referred to as ureido monomers. Further suitable ureido monomers of Formula 3 are described in "Novel wet adhesion monomers for use in latex paints" Singh et al, Progress in Organic Coatings, 34 (1998), 214-219, (see especially sections 2.2 & 2.3) and EP 0629672 (National Starch) both of which are hereby incorporated by reference. Conveniently the monomers of Formula 2 may be used as a substantially pure compound (or mixture of compounds) or may be dissolved in a suitable solvent such as a suitable (meth)acrylate or acrylic derivative for example methyl methacrylate.

Another suitable adhesion promoting monomer is hydroxypropylcarbamatacrylate (HPCA) which for example is available commercially from BASF as a 70% solution in ethanol (HPCA 70% EtOH)
HPCA has the structure

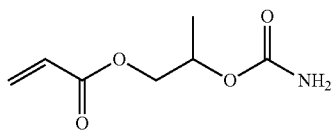

and is useful as a (wet) adhesion promoter and/or cross-linker. It may be biobased and/or produced by enzymes.

The aqueous copolymer composition of the invention may be radiation cured. For example a urethane acrylate copolymer according to the invention can comprise UV curing molecules bearing more than one unsaturated polymerisable group. These UV curing molecules can be polyurethanes, polyesters or polyethers.

The radiation-curability of the UV curing molecules results (as mentioned above) from the presence of olefinically unsaturated bonds, and takes place by a free-radical mechanism. Such bonds may e.g. be contained in (meth)acryloyl groups pendant or chain terminal to the polymer chain.

The radiation used for crosslinking (i.e. curing) the UV curing molecules, after drying, may be provided by any suitable form of radiant energy, but is preferably ultra-violet (uv) radiation. In principle, electron-beam (eb) radiation or (in some cases) visible radiation could be used. When crosslinking is effected by UV radiation (or visible radiation), the composition will normally include at least one photoinitiator (or sensitizer), usually present in an amount 0.1 to 10% by weight, based on the solid polymer weight of the copolymer composition. Examples of UV photoinitiators include halogenated polynuclear ketones such as chlorosulphonated benzanthones, chlorosulphonated fluorenones, alpha-haloalkylated benzanthones, alpha-haloalkylated fluorenones and alkyl phenones. Accelerator compounds may be included if desired to enhance the cure rate. (When curing is to be effected by eb radiation, photoinitiator is not required).

Radiation crosslinking of the UV curing molecules will occur when the coating is subjected to suitable radiation, and, again this can be done before, during and/or after drying the applied wet film (usually shortly after drying). To effect the radiation curing of the UV curing molecules, the aqueous phase of a wet film of the composition is sometimes flashed off quickly (at an elevated temperature) to dry the composition before applying radiation at ambient (or a higher) temperature. Curing by radiation will take place far more rapidly than curing by non-radically-formed covalent bond formation.

The UV curing molecule(s) can include a wide variety of multi-functional materials may be employed. Typical examples include: epoxy (meth)acrylates, urethane (meth)acrylates, multi-functional (meth)acrylate monomers, and/or amine-(meth)acrylate adducts.

Epoxy (meth)acrylates are those products formed by the reaction of (meth)acrylic acid with an epoxy(glycidyl) functional component e.g. aliphatic and aromatic containing epoxy resins, epoxidised oils, acrylic polymers and acrylic grafted polymers in which the acrylic component contains pendent epoxy groups. Some of the (meth)acrylic acid may be replaced by other acids, both ethylenically unsaturated and saturated, so as to impart specific properties e.g. aliphatic acids, fatty acids and aromatic acids.

These products may alternatively be prepared by the reaction of a carboxylic acid functional component (e.g. polyesters and acrylic polymers) with a second component containing both epoxy groups and ethylenic unsaturation e.g. glycidyl (meth)acrylate. Urethane (meth)acrylates are those products formed by the reaction of an isocyanate containing component with a hydroxyl containing component. At least one of these components must contain ethylenic unsaturation. Examples of isocyanate functional components are hexamethylene diisocyanate, isophorone diisocyanate, isocyanate functional acrylic polymers and polyurethanes, reaction products of hydroxyl functional components (e.g. poly-ethylene glycol, poly-propylene glycol and di-, tri- and etc-hydroxy aliphatic alcohols (e.g. glycerol and trimethylolpropane) and their ethoxylated, propoxylated and polycaprolactone analogs) with di-, tri- and etc-isocyanates (e.g. hexamethylene diisocyanate, isophorone diisocyanate and TDI). Examples of hydroxy containing ethylenically unsaturated components are hydroxyethyl (meth)acrylate and its ethoxylated, propoxylated and polycaprolactone analogs.

Multi-functional (meth)acrylate monomers are (meth)acrylic acid esters of di-, tri- and etc-hydroxyl alcohols (e.g. poly-ethylene glycol, poly-propylene glycol, aliphatic diols, neopentyl glycol, ethoxylated bisphenol A, trimethylolpropane, pentaerythritol, glycerol, di-trimethylolpropane, hydroxyl functional polyesters, dipentaerythritol and the ethoxylated, propoxylated and polycaprolactone analogs of all the above.

Amine-(meth)acrylate adducts are those products prepared by the partial "Michael Type Addition" of primary and secondary amines to ethylenic unsaturation i.e. the double bond of (meth)acrylate containing compounds. Of particular interest here are the multi-functional (meth)acrylate monomers as mentioned above. Examples of amine-acrylate adducts are diethylamine modified trimethylolpropane triacrylate and ethanolamine modified ethoxylated trimethylolpropane triacrylate.

Polyurethane polymers are typically prepared from reactants which comprise an organic polyisocyanate component (usually a diisocyanate component although tri or higher functionality isocyanates can be employed) and a component comprising a compound(s) bearing NCO-reactive groups, particularly a macro or polymeric polyol (number average molecular weight $Mn>=500$), optionally with the inclusion of a low molecular weight polyol ($Mn<=499$). Monoisocyanates and monools may also be included in the synthesis.

The necessary olefinic unsaturation in the polyurethane (for radiation curability) could be introduced in a variety of ways. For example, a mono or poly (meth)acrylated mono or polyisocyanate could be employed in a urethane synthesis as part of the polyisocyanate component. More usually, (meth)acryloyl functional monool or polyol (usually an oligomeric or polymeric monool or polyol, and more usually a diol) could be employed as part of the polyol component-such compounds are available commercially, and may not need to be synthesised.

The aqueous polyurethane acrylate copolymer composition can be made in various ways. Especially preferred methods comprise: 1) blending a polyurethane emulsion or a urethane-acrylic copolymer emulsion not according to the invention with a polyvinyl copolymer emulsion according to the composition described under b—above, or 2) polymerizing a monomer composition according to the invention in the presence of a polyurethane emulsion. This latter approach can be operated in three ways. 2a) either the polyurethane resin(s) is dissolved in the monomer phase, after which this mixture is emulsified and the monomers are polymerised, or 2b) monomer is added batch wise or semi-batch wise to a pre-made polyurethane emulsion. Finally, 2c) a combination of processes 2a and 2b is possible, where the polyurethane resin(s) is dissolved in part of the monomers, after which the mixture is emulsified, followed by batch or semi-batch addition of the remaining monomer phases, while the polymerization is ongoing.

In case of a (partly) semi-batch process, the monomer phase(s) is preferably fed over a period of less than 4 hours, more preferred less than 2 hours, and most preferred between 0.5 and 2 hours. Just as in the case of polyvinyl copolymer emulsions, adding different monomer phases sequentially is possible and is known to yield interesting properties with regard to MFT-hardness balance.

The most preferred process is a batch process, either according to process 2a) or 2b). Most preferred is that at least part of the monomer is used to dissolve the polyurethane prior to emulsification.

In an especially preferred embodiment the polymerization is followed by the addition of a so-called chaser monomer composition as described in WO2011/073417. In this case, preferably, between 5 and 20 parts by weight of 100 parts of polymer (b) consists of an itaconate monomer free monomer phase. Preferably, this chaser monomer phase contains at least 50 parts by weight of styrene or acrylate ester monomers.

Other features of the polyurethane (a) are conventional and well known to those skilled in the art (for example as described in WO99/016805 (the contents of which is hereby incorporated herein by reference).

Thus for example the polyurethane (a) can be made emulsifyable by neutralization of acid groups in the polyurethane backbone or by addition of a polymer surfactant or a regular low molecular weight surfactant. In the case that acid groups on the polyurethane backbone are neutralized, this can be done with organic amines, such as for instance triethyl amine, or dimethyl butyl amine, or with in inorganic base, such as LiOH, NaOH or KOH. It is also possible to introduce to the polyurethane backbone emulsifiable groups that have a very low pKa, such as for instance sulphate or sulphonate groups, or phosphate or phosphonate groups. Finally, emulsifiable groups that can be introduced to the polyurethane backbone are non-ionically stabilizing groups, such as polyethylene glycol chains or methyl ether capped polyethylene glycol chains.

Typically, the base-acid ratio is between 0.5 and 1.5, more preferably between 0.8 and 1.2. In those cases where the base-acid ratio is less than 0.8, additional surfactant (either polymeric or low molecular weight) can be used to aid in the emulsification.

Preferably, the acid value of the polyurethane polymer (a) is less than 90 mg KOH/g of solid polyurethane, more preferably less than 80 mg KOH/g, most preferably between 2 and 45 mg KOH/g, and typically between 10 and 35 mg KOH/g of solid polyurethane.

Although in a preferred embodiment the polyurethane (a)—having at least part of the acid groups neutralized—will serve as the colloidal stabilizer for the polyvinyl composition, the aqueous copolymer composition may also or instead comprise conventional surfactants. The surfactant(s) may be used in a total amount less than 5 parts by weight based on 100 parts by weight of the total amount of copolymer (a) and (b), more preferably less than 3 parts by weight, even more preferred less than 1 by part, and typically less than 0.1 part by weight, Alternatively surfactant is not used.

Where present the surfactant(s) may comprise anionic, cationic, non-ionic, and/or suitable mixtures thereof.

The aqueous emulsion polymerization can employ conventional free radical initiators such as peroxides, persulphates and redox systems as are well known in the art. The amount of initiator used is generally 0.05 to 3% based on the weight of total monomers charged.

The polymerisation technique employed may be such that a low molecular weight polymer is formed, e.g. by employing a chain transfer agent such as one selected from mercaptans (thiols), certain halohydrocarbons and alpha-methyl styrene; or catalytic chain transfer polymerisation using for example cobalt chelate complexes as is quite conventional. Alternatively a controlled radical polymerisation process can be used, for instance by making use of an appropriate nitroxide or a thiocarbonylthio compounds such as dithio-esters, dithiocarbamates, trithiocarbonates, and xanthates in order to mediate the polymerization via for example a nitrox mediated polymerisation (NMP), a reversible addition fragmentation chain-transfer process (RAFT) or atom transfer radical polymerization (ATRP).

For polymers of the invention especially those to be used in coating compositions, providing amino functional groups thereon may also be useful as such groups provide enhanced adhesion to certain substrates, such as wood and alkyd resins. Amino groups may be incorporated into a polymer by using a carboxyl functional precursor for example prepared by employing dimethylol propanoicacid acid. At least some of the carboxy-functional groups may be converted to amino groups (as part of amino ester groups) by reaction with alkylene imines such as ethylene imine, propylene imine or butylene imine. Such a reaction is well established in the art, being known as an imination reaction and the details of this are for example taught in U.S. Pat. No. 7,049,352 the contents of which are hereby incorporated herein by reference. Therefore a further aspect of the invention comprises iminated versions of all the copolymers of the present invention as described herein.

The composition may comprise volatile organic compounds (VOC) in an amount of less than 100 g/L, preferably be substantially free of VOC.

The compositions of the invention may be applied to a variety of substrates including wood, board, metals, stone, concrete, glass, cloth, leather, paper, plastics, foam and the like, by any conventional method including brushing, dipping, flow coating, spraying, and the like. The coating composition of the invention may also be used to coat the interior and/or exterior surfaces of three-dimensional articles. The coating compositions of the invention may also be used, appropriately formulated if necessary, for the provision of films, polishes, varnishes, lacquers, paints, inks and adhesives. However, they are particularly useful and suitable for providing the basis of protective coatings for substrates that comprise wood (e.g. wooden floors), plastics, polymeric materials, paper and/or metal.

The compositions of the invention may be used in various applications and for such purposes may be optionally further combined or formulated with other additives and/or components, such as defoamers, rheology control agents, thickeners, dispersing and/or stabilizing agents (usually surfactants and/or emulsifiers), wetting agents, fillers, extenders, fungicides, bactericides, coalescing and wetting solvents or co-solvents (although solvents are not normally required), plasticisers, anti-freeze agents, waxes, colorants, pigments, dyes, heat stabilisers, levelling agents, anti-cratering agents, fillers, sedimentation inhibitors, UV absorbers, antioxidants, reactive diluents, neutralising agents, adhesion promoters and/or any suitable mixtures thereof.

In a special embodiment of the invention is provided an aqueous copolymer composition comprising a urethane acrylate copolymer combination, more preferably an aqueous crosslinkable copolymer composition comprising a urethane acrylate copolymer combination according to the invention, where between 5 and 10% of the total weight of monomer(s) is added as a so-called chaser monomer feed, preferably comprising styrene, methyl acrylate, ethyl acrylate, or butyl acrylate where the aqueous copolymer composition has a residual monomer level of less than 5000 ppm, more preferably less than 3000 ppm, most preferably less than 1000 ppm, and typically less than 500 ppm.

In another embodiment of the invention is provided an aqueous copolymer composition comprising a urethane acrylate copolymer combination, more preferably an aqueous crosslinkable copolymer composition comprising a urethane acrylate copolymer combination according to the invention, where the polyvinyl phase comprises multifunctional (meth)acrylate monomers, preferably in an amount of less than 5 parts by weight based on total weight of the polyvinyl phase being 100 parts by weight, more preferably less than 3 parts by weight, and most preferably from 0.05 to 1 parts by weight, for example from 0.1 to 0.75 parts by weight In another special embodiment of the invention is provided a process of producing an aqueous copolymer composition comprising a urethane acrylate copolymer combination, more preferably an aqueous crosslinkable copolymer composition comprising a urethane acrylate copolymer combination according to the invention, where the aqueous copolymer composition has a residual monomer level of less than 5000 ppm, more preferably less than 3000 ppm, most preferably less than 1000 ppm, and typically less than 500 ppm.

In another special embodiment of the invention is provided an aqueous copolymer composition comprising a urethane acrylate copolymer combination, more preferably an aqueous crosslinkable copolymer composition comprising a urethane acrylate copolymer combination according to the invention, where the polyurethane composition consists of at least 10 wt-%, more preferred at least 20 wt-%, most preferred at least 30 w-%, and typically of at least 50 wt-% on total polyurethane weight of biobased and/or biorenewable materials.

In another embodiment of the invention is provided an aqueous crosslinkable copolymer composition comprising a urethane acrylate copolymer combination according to the invention, comprising admixed UV curing molecules as described herein. Preferably, the concentration of UV curing molecules is between 0.5 and 40 wt-% on total copolymer composition, more preferably between 5 and 30 wt-%, most preferably between 10 and 25 wt-% on total weight of the copolymer composition.

In an embodiment of the invention is provided an aqueous copolymer composition comprising a urethane acrylate copolymer combination, more preferably an aqueous crosslinkable copolymer composition comprising a urethane acrylate copolymer combination according to the invention, comprising a separate polyvinyl polymer emulsion preferably with a Tg of at least 70° C., more preferred of at least 80° C., and an average particle size, as determined with dynamic light scattering, of between 20 and 200 nm, more preferred between 35 and 120 nm. Preferably the ratio of urethane acrylate copolymer emulsion to the separate polyvinyl polymer emulsion is between 95:5 and 70:30, more preferred between 95:5 and 80:20, based on dry weight of polymer.

In a further embodiment of the invention is provided an aqueous copolymer composition comprising a urethane acrylate copolymer combination, more preferably an aqueous crosslinkable copolymer composition comprising a urethane acrylate copolymer combination according to the invention, comprising hollow sphere pigment particles, such as for instance ROPAQUE™ DUAL, ROPAQUE™ ULTRA, ROPAQUE™ ULTRA E, and ROPAQUE™ Ultra EF (ex. DOW).

In a still other embodiment of the invention is provided an aqueous copolymer composition comprising a urethane acrylate copolymer combination, more preferably an aqueous crosslinkable copolymer composition comprising a urethane acrylate copolymer combination according to the invention, wherein the polyurethane has an acid value of between 2 and 90 mg KOH/g of solid polyurethane and the polyvinyl copolymer has an acid value of less than 10 mg KOH/g of solid polyvinyl copolymer, more preferred less than 3.5 mg KOH, and most preferred of 0 mg KOH/g of solid polyvinyl copolymer.

In a yet further embodiment of the invention is provided an aqueous copolymer composition comprising a urethane acrylate copolymer combination, more preferably an aqueous crosslinkable copolymer composition comprising a urethane acrylate copolymer combination according to the invention, wherein the polyurethane has an acid value of less than 10 mg KOH/g of solid polyurethane and the aqueous urethane acrylate copolymer combination comprises between 0.2 and 3.5 wt-% of surfactant calculated on total solid polymer weight.

In another embodiment of the invention is provided an aqueous copolymer composition comprising a urethane acrylate copolymer combination, more preferably an aqueous crosslinkable copolymer composition comprising a urethane acrylate copolymer combination according to the invention, wherein the polyurethane has an acid value of less than 10 mg KOH/g of solid polyurethane and the aqueous urethane acrylate copolymer combination comprises between 2.5 and 15 wt-% of an alkaline soluble polyvinyl oligomer (such as described in SMC 400072).

In an embodiment of the invention is provided an aqueous copolymer composition comprising a urethane acrylate copolymer combination, more preferably an aqueous crosslinkable copolymer composition comprising a urethane acrylate copolymer combination according to the invention, wherein both the polyurethane and the polyvinyl fraction both have crosslinking functionalities based on keto or acetoacetoxy groups, and the aqueous polyurethane acrylate copolymer combination also comprises a polyamine, a polyhydrazide, a polyhydrazine, or a polysemicarbazide.

Whilst the term vinyl polymer is commonly used to refer to thermoplastic polymers derived by polymerization from compounds containing the vinyl group ($CH_2=CH-$), the term "vinyl polymer" is used herein more broadly to denote any polymer (whether thermoplastic or not) that comprises (e.g. as repeat units therein) and/or is derived from monomers and/or polymer precursors comprising one or more of the following moieties: activated unsaturated moieties (such as acrylates and/or methacrylates); any olefinically unsaturated moieties (such as vinyl moieties); mixtures thereof; and/or combinations thereof within the same moiety.

There is an increasing demand to use bio-renewable monomers in order to improve the sustainability of the polymers used in for example coating applications. In view of concerns about depletion of fossil fuel resources or an increase in carbon dioxide in the air that poses a global-scale environmental problem in recent years, methods for producing raw materials of these polymers from biomass resources have attracted al lot of attention. Since these resources are renewable and therefore have a carbon-neutral biomass, such methods are expected to gain in particular importance in future. It is therefore a preferred feature of the present invention and the aspects described herein that where possible the monomers (especially the higher itaconate diesters such as DBI) as far as possible are biorenewable.

Preferably at least 20 wt-%, more preferably at least 30 wt-%, and especially 40 wt-% of the olefinically unsaturated monomers used to form the polymers of the invention are derived from at least one bio-renewable olefinically unsaturated monomer. Bio-renewable monomers may be obtained fully or in part from bio-renewable sources. In a preferred embodiment methacrylate monomers are used as monomer (c) where the alcohol is made from biorenewable sources. In yet another preferred embodiment both the (meth)acrylate unit and the possible alcohol are made from biorenewable sources. Thus it is preferred to also measure the carbon-14 content to determine the biorenewability.

The content of carbon-14 (C-14) is indicative of the age of a bio-based material. It is known in the art that C-14, which has a half life of about 5,700 years, is found in bio-renewable materials but not in fossil fuels. Thus, "bio-renewable materials" refer to organic materials in which the carbon comes from non-fossil biological sources. Examples of bio-renewable materials include, but are not limited to, sugars, starches, corns, natural fibres, sugarcanes, beets, citrus fruits, woody plants, cellulosics, lignocelluosics, hemicelluloses, potatoes, plant oils, other polysaccharides such as pectin, chitin, levan, and pullulan, and a combination thereof.

C-14 levels can be determined by measuring its decay process (disintegrations per minute per gram carbon or dpm/gC) through liquid scintillation counting. In one embodiment of the present invention, polymer A and or polymer B comprise at least about 1.5 dpm/gC (disintegrations per minute per gram carbon) of carbon-14, more preferably at least 2 dpm/gC, most preferably at least 2.5 dpm/gC, and especially at least 4 dpm/gC.

Acrylic acid can be made from glycerol, as is disclosed by Arkema, or from lactic acid as described by U.S. Pat. No. 7,687,661. Methacrylic acid can be prepared from ethene, methanol and carbon monoxide (all bio-renewable), as disclosed by Lucite International Ltd.

Olefinically unsaturated bio-renewable monomers which may additionally provide a contribution to improved coating properties include α-methylene butyrolactone, α-methylene valerolactone, α-methylene γ-$R^3$ butyrolactone ($R^3$ can be an optionally substituted alkyl or optionally substituted aryl); itaconates such as dialkyl itaconates (including DBI) and monoalkyl itaconates, itaconic acid, itaconic anhydride, crotonic acid and alkyl esters thereof, citraconic acid and alkyl esters thereof, methylene malonic acid and its mono and dialkyl esters, citraconic anhydride, mesaconic acid and alkyl esters thereof.

Another useful set of useful bio-renewable monomers include N—$R^2$, α-methylene butyrolactam ($R^2$ can be an optionally substituted alkyl or optionally substituted aryl); N—$R^2$, α-methylene γ-$R^1$ butyrolactam; N-alkyl itaconimids; furfuryl (meth)acrylate; fatty acid functional (meth) acrylates such as DAPRO FX-522 from Elementis and Visiomer® MUMA from Evonik.

It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination.

The object of the present invention is to solve some or all of the problems or disadvantages (such as identified throughout the application herein) with the prior art.

Unless the context clearly indicates otherwise, as used herein plural forms of the terms herein are to be construed as including the singular form and vice versa.

The term "comprising" as used herein will be understood to mean that the list following is non exhaustive and may or may not include any other additional suitable items, for example one or more further feature(s), component(s), ingredient(s) and/or substituent(s) as appropriate.

The terms 'effective', 'acceptable' 'active' and/or 'suitable' (for example with reference to any process, use, method, application, preparation, product, material, formulation, compound, monomer, oligomer, polymer precursor, and/or polymers described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

Preferred utility of the present invention comprises as component of a coating composition.

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

Thus for example a substance stated as present herein in an amount from 0 to "x" (e.g. in units of mass and/or weight %) is meant (unless the context clearly indicates otherwise) to encompass both of two alternatives, firstly a broader alternative that the substance may optionally not be present (when the amount is zero) or present only in an de-minimus amount below that can be detected. A second preferred alternative (denoted by a lower amount of zero in a range for amount of substance) indicates that the substance is present, and zero indicates that the lower amount is a very small trace amount for example any amount sufficient to be detected by suitable conventional analytical techniques and more preferably zero denotes that the lower limit of amount of substance is greater than or equal to 0.001 by weight % (calculated as described herein).

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

In the present invention, unless the context clearly indicates otherwise, an amount of an ingredient stated to be present in the composition of the invention when expressed as a weight percentage, is calculated based on the total amount of monomers in the composition being equivalent to 100% (thus for example components (a)+(b)+(c)+(d) total 100%). For convenience certain non monomer ingredients (such as for example chain transfer agents (CTA)) which fall outside the definitions of any of components (a) to (d) may also be calculated as weight percentages based on total monomer (i.e. where the weight of total monomers alone is set at 100%). As the weight % of monomers (for example for components (a) to (d)) by definition total 100% it will be seen that using monomer based weight % values for the non-monomer ingredients (i.e. those components outside (a) to (d)) will mean the total percentages will exceed 100%. Thus amounts of non-monomer ingredients expressed as monomer based weight percentages can be considered as providing a ratio for the weight amounts for these ingredients with respect to the total weight of monomers which is used only as a reference for calculation rather than as a strict percentage. Further ingredients are not excluded from the composition when (a)+(b)+(c)+(d) total 100% and weight percentages based on total monomers should not be confused with weight percentages of the total composition.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole.

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulphonyl if directly attached to each other represent a sulphamoyl group). Preferred optional substituents comprise: carboxy, sulpho, hydroxy, amino, mercapto, cyano, methyl, halo, trihalomethyl and/or methoxy.

The synonymous terms "organic substituent", "moiety", and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulphur, more preferably from hydrogen, nitrogen, oxygen, phosphorus and/or sulphur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbo group' as used herein is a sub-set of a organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbo groups may comprise one or more of the following groups. Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valences of which are not engaged in a double bond (for example alkylene). Hydrocarbylidene groups comprise divalent groups (which may be represented by "$R_2C=$") formed by removing two hydrogen atoms from the same carbon atom of a hydrocarbon, the free valences of which are engaged in a double bond (for example alkylidene). Hydrocarbylidyne groups comprise trivalent groups (which may be represented by "$RC\equiv$"), formed by removing three hydrogen atoms from the same carbon atom of a hydrocarbon the free valences of which are engaged in a triple bond (for example alkylidyne). Hydrocarbo groups may also comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups The term 'alkyl' or its equivalent (e.g. 'alk') as used herein may be readily replaced, where appropriate and unless the context clearly indicates otherwise, by terms encompassing any other hydrocarbo group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbo species linking two or more moieties (such as bivalent hydrocarbylene radicals e.g. alkylene).

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example $C_{1-N}$organo, signifies a organo moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Preferably any of the organo groups listed herein comprise from 1 to 36 carbon atoms, more preferably from 1 to 18. It is particularly preferred that the number of carbon atoms in an organo group is from 1 to 12, especially from 1 to 10 inclusive, for example from 1 to 4 carbon atoms.

As used herein chemical terms (other than IUAPC names for specifically identified compounds) which comprise features which are given in parentheses—such as (alkyl)acrylate, (meth)acrylate and/or (co)polymer—denote that that part in parentheses is optional as the context dictates, so for example the term (meth)acrylate denotes both methacrylate and acrylate.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cyptands/cryptades, inclusion compounds, intercalation compounds, interstitial compounds, ligand complexes, organometallic complexes, non-stoichiometric complexes, π-adducts, solvates and/or hydrates); isotopically substituted forms, polymeric configurations [such as homo or copolymers, random, graft and/or block polymers, linear and/or branched polymers (e.g. star and/or side branched), cross-linked and/or networked polymers, polymers obtainable from di and/or trivalent repeat units, dendrimers, polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective as defined herein.

Polymers of the present invention may be prepared by one or more suitable polymer precursor(s) which may be organic and/or inorganic and comprise any suitable (co)monomer(s), (co)polymer(s) [including homopolymer(s)] and mixtures thereof which comprise moieties which are capable of forming a bond with the or each polymer precursor(s) to provide chain extension and/or cross-linking with another of the or each polymer precursor(s) via direct bond(s) as indicated herein.

Polymer precursors of the invention may comprise one or more monomer(s), oligomer(s), polymer(s); mixtures thereof and/or combinations thereof which have suitable polymerisable functionality. It will be understood that unless the context dictates otherwise term monomer as used herein encompasses the term polymer precursor and does not necessarily exclude monomers that may themselves be polymeric and/or oligomeric in character.

A monomer is a substantially monodisperse compound of a low molecular weight (for example less than one thousand g/mole) which is capable of being polymerised.

A polymer is a polydisperse mixture of macromolecules of large molecular weight (for example many thousands of g/mole) prepared by a polymerisation method, where the macromolecules comprises the multiple repetition of smaller units (which may themselves be monomers, oligomers and/or polymers) and where (unless properties are critically dependent on fine details of the molecular structure) the addition or removal one or a few of the units has a negligible effect on the properties of the macromolecule.

A oligomer is a polydisperse mixture of molecules having an intermediate molecular weight between a monomer and polymer, the molecules comprising a small plurality of monomer units the removal of one or a few of which would significantly vary the properties of the molecule.

Depending on the context the term polymer may or may not encompass oligomer.

The polymer precursor of and/or used in the invention may be prepared by direct synthesis or (if the polymeric precursor is itself polymeric) by polymerisation. If a polymerisable polymer is itself used as a polymer precursor of and/or used in the invention it is preferred that such a polymer precursor has a low polydispersity, more preferably is substantially monodisperse, to minimise the side reactions, number of by-products and/or polydispersity in any polymeric material formed from this polymer precursor. The polymer precursor(s) may be substantially un-reactive at normal temperatures and pressures.

Except where indicated herein polymers and/or polymeric polymer precursors of and/or used in the invention can be (co)polymerised by any suitable means of polymerisation well known to those skilled in the art. Examples of suitable methods comprise: thermal initiation; chemical initiation by adding suitable agents; catalysis; and/or initiation using an optional initiator followed by irradiation, for example with electromagnetic radiation (photo-chemical initiation) at a suitable wavelength such as UV; and/or with other types of radiation such as electron beams, alpha particles, neutrons and/or other particles.

The substituents on the repeating unit of a polymer and/or oligomer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or cross linking with such other resins as appropriate.

Another aspect of the invention broadly provides a coating composition comprising the polymers and/or beads of the present invention and/or as described herein.

A further aspect of the invention provides a coating obtained or obtainable from a coating composition of the present invention.

A yet other aspect of the invention broadly provides a substrate and/or article having coated thereon an (optionally cured) coating composition of the present invention.

A yet further aspect of the invention broadly provides a method of using polymers of the present invention and/or as described herein to prepare a coating composition.

A still further aspect of the invention broadly provides a method for preparing a coated substrate and/or article comprising the steps of applying a coating composition of the present invention to the substrate and/or article and optionally curing said composition in situ to form a cured coating thereon. The curing may be by any suitable means, such as thermally, by radiation and/or by use of a cross-linker.

Preferred coating compositions are solvent coating compositions or aqueous coating compositions, more preferably are aqueous coating compositions.

Optionally aqueous coating compositions may also comprise a co-solvent. A co-solvent, as is well known in the coating art, is an organic solvent employed in an aqueous composition to ameliorate the drying characteristics thereof, and in particular to lower its minimum film forming temperature. The co-solvent may be solvent incorporated or used during preparation of polymers of the invention or may have been added during formulation of the aqueous composition.

The compositions of the invention are particularly useful as or for providing the principle component of coating formulations (i.e. composition intended for application to a substrate without further treatment or additions thereto) such as protective or decorative coating compositions (for example paint, lacquer or varnish) wherein an initially prepared composition optionally may be further diluted with water and/or organic solvents, and/or combined with further ingredients or may be in more concentrated form by optional evaporation of water and/or organic components of the liquid medium of an initially prepared composition.

The compositions of the invention may be used in various applications and for such purposes may be optionally further combined or formulated with other additives and/or components, such as defoamers, rheology control agents, thickeners, dispersing and/or stabilizing agents (usually surfactants and/or emulsifiers), wetting agents, fillers, extenders, fungicides, bacteriocides, coalescing and wetting solvents or co-solvents (although solvents are not normally required), plasticisers, anti-freeze agents, waxes, colorants, pigments, dyes, heat stabilisers, levelling agents, anti-cratering agents, fillers, sedimentation inhibitors, UV absorbers, antioxidants, reactive diluents, neutralising agents, adhesion promoters and/or any suitable mixtures thereof.

The aforementioned additives and/or components and the like may be introduced at any stage of the production process or subsequently. It is possible to include fire retardants (such as antimony oxide) to enhance fire retardant properties.

The compositions of the invention may also be blended with other polymers such as vinyl polymers, alkyds (saturated or unsaturated), polyesters and or polyurethanes.

The coating composition of the invention may be applied to a variety of substrates including wood, board, metals, stone, concrete, glass, cloth, leather, paper, plastics, foam and the like, by any conventional method including brushing, dipping, flow coating, spraying, and the like. The coating composition of the invention may also be used to coat the interior and/or exterior surfaces of three-dimensional articles. The coating compositions of the invention may also be used, appropriately formulated if necessary, for the provision of films, polishes, varnishes, lacquers, paints, inks and adhesives. However, they are particularly useful and suitable for providing the basis of protective coatings for substrates that comprise wood (e.g. wooden floors), plastics, polymeric materials, paper and/or metal.

The carrier medium may be removed from the compositions of the invention once they have been applied to a substrate by being allowed to dry naturally at ambient temperature, or the drying process may be accelerated by heat. Crosslinking can be developed by allowing to stand for a prolonged period at ambient temperature (several days) or by heating at an elevated temperature (e.g. 50° C.) for a much shorter period of time.

A still further aspect of the present invention comprises paints obtained, obtainable and/or comprising polymer compositions of the invention, especially where polymers compositions of the invention are emulsion polymers. Thus for example paint made from the emulsion polymer compositions of this invention may contain pigment at pigment volume concentrations in the range of 0 to 85%, preferably in the range of 0 to 55%. The pigment volume concentration of a species of pigment particles is the percentage of the volume occupied by that species of pigment particles, based on the total volume of the dried coating prepared from the emulsion polymer compositions. Suitable pigments include inorganic pigments, such as titanium dioxide, iron oxide, zinc oxide, magnesium silicate, calcium carbonate, organic and inorganic colored pigments, aluminosilicates, silica, and various clays. Titanium dioxide is a preferred for its ability to provide opacity. Suitable organic pigments also include plastic pigments such as solid bead pigments and microsphere pigments containing voids or vesicles. Examples of solid bead pigments include polystyrene and polyvinyl chloride beads. Examples of microsphere pigments, which include polymer particles containing one or more voids and vesiculated polymer particles, are disclosed in U.S. Pat. No. 4,427,836, U.S. Pat. No. 4,920,160, U.S. Pat. No. 4,594,363, U.S. Pat. No. 4,469,825, U.S. Pat. No. 4,468,498, U.S. Pat. No. 4,880,842, U.S. Pat. No. 4,985,064, U.S. Pat. No. 5,157,084, U.S. Pat. No. 5,041,464, U.S. Pat. No. 5,036,109, U.S. Pat. No. 5,409,776 and U.S. Pat. No. 5,510,422. Other suitable pigments include, for example, Expancel™ 551 DE20 acrylonitrile/vinyl chloride expanded particles (Expancel Inc. Duluth Ga.); Sil-Cell™ 35/34 sodium potassium aluminum silicate particles (Silbrico Corporation, Hodgkins Ill.); Dualite™ 27 polyvinylidene chloride copolymer coated with $CaCO_3$ (Pierce and Stevens Corporation, Buffalo N.Y.); Fillitte™ 150 ceramic spherical particles (Trelleborg Fillite Inc. Norcross Ga.); Microbeads™ 4A soda lime particles (Cataphote Inc.); Sphericell™ hollow glass particles (Potter Industries Inc. Valley Forge Pa.); Eccosphere™ hollow glass spheres (New Metals & Chemicals Ltd.; Essex England); Z-light™ Zeeospheres W-410 and W-610 ceramic hollow spheres (3M St. Paul Minn.); Scotchlite™ K46 glass bubbles (3M St. Paul Minn.); Vistamer™ UH 1500 polyethylene particles; and Vistamer™ HD 1800 polyethylene particles (Fluoro-Seal Inc., Houston Tex.). Ropaque™ Polymer is a preferred component in the coatings. Z-light™ Zeeospheres W-410 and W-610 ceramic hollow spheres are also preferred components. Combinations of the above ingredients are frequently preferred.

Paints prepared from the emulsion polymer compositions of this invention may be thickened with various aqueous thickening agents. These include but not are limited to Hydrophobically Modified Alkali swellable emulsion such Acrysol™ TT-935, Acrysol™ TT-615, Acrysol™ RM-6, Polyphobe™ TR-116. Alkali swellable emulsions such as Acrysol™ ASE-60 may also be used. Hydrophobically modified water soluble polymers may also be used such as Acrysol™ RM-2020, Acrysol™ RM-8, Aquaflow™ XLS-500, Aquaflow™ NHS-310, Rheolate™ CVS-11, and hydrophobically modified HEC such as Natrosol™ Plus 330. Hydroxyethyl cellulose may also be used such as Natrosol™ HBR, or Cellosize™ QP-3000. Clays such as Attagel™ 50 or Bentone™ DE may also be used for sagging and settling control.

Paints prepared from the emulsion polymer compositions of this invention may utilize dispersants to help stabilize the pigments in the paint. Polyacid dispersants such as Hydropalat™ 44, or hydrophobic copolymer dispersants such as Tamol™ 681, Tamol™ 165, and Tamol™ 731 may be used. Styrene Maleic anhydride copolymers may also be used. Small molecule dispersants such as polyphosphates and citric acid may also be used. Examples of polyphosphates include tetra-potassium pyrophosphate, potassium tripolyphosphate, sodium hexameta phosphate, and higher phosphates sold under the trade name Calgon™. The latter phosphates are used in conjunction with ZnO pigments to help provide stability.

Paints prepared from the emulsion polymer compositions of this invention may utilize coalescing aids to aid in the film formation of the latex emulsion polymers. These coalescing aids can be volatile such as ethoxy and propoxy ethers of common alcohols. Examples include ethylene glycol monobutyl ether, diethylene glycol monobutyl ether, propylene glycol monobutyl, and dipropylene glycol monobutyl ether. A common and preferred coalescing agent is Texanol™. Paints prepared from the emulsion polymer compositions of this invention may also utilize non volatile coalescing agents which do not contribute to VOC's. These coalescing agents would include materials like Optifilm™ 400, Dioctyl maleate, triethyl citrate, or tributyl phosphate. In some instances oxidatively curing reactive plasticizers such as Oxi-Cure™ 100 may be used. In addition the paint may also contain a humectant material such as ethylene glycol or propylene glycol. Open time additives such as Rhodaline™ OTE, or Optifilm™ OT1200 may also be used. It is preferred that the paint made from the emulsion polymer compositions contain less than 5% VOC by weight based on total weight of the composition. More preferred are paint compositions containing less than 2% VOC by weight, and most preferred are paint compositions containing less than 0.05% VOC by weight.

Paints prepared from the emulsion polymer compositions of this invention will also contain added surfactants. These surfactants are used to improve substrate wetting, insure pigment and colorant compatibility, and improve stability. Nonionic surfactants such as ethoxylated alcohols are frequently added to improve free/thaw stability and colorant compatibility. These would include low HLB nonionics such as Igepal™ CO-430, Igepal™ CO-630 and higher HLB nonionics such as Triton X-405. For these surfactants it is also desirable to use analogs based on alkyl alcohols such as tridecyl alcohol, or branched secondary alcohols such as Tergitol™ TMN-10. Triton™ CF-10 is also quite commonly used to aid in pigment wetting. Dioctyl sulfosuccinates are frequently used to enhance substrate wetting such as Aerosol™ OT-100. Acetylenic diols such as Surfynol™ 104 can also be used and are sometimes desired due to their low dynamic surface tension. Phosphate based surfactants can also be employed particularly to improve $TiO_2$ compatibility and stability. These would include surfactants from the Strodex™ line such as PK-90 or PK-0VOC.

Paints prepared from the emulsion polymer compositions of this invention may also contain additives which can alter the surface blocking characteristics. Such additives would include fluorocarbon surfactants such as Capstone™ FS-61.

Paints prepared from the emulsion polymer compositions of this invention may also contain multivalent metal ions to provide for post film formation crosslinking. These multivalent metal ions will improve the hardness, and scratch resistance of the final paint as well as to improve the chemical resistance. In particular it is seen that this will improve resistance to organic solvents. Examples of multivalent metal ions include Zn, Mg, Zr, and Ca. These are frequently added in the form of water soluble salts such as acetates or carbonates. Zinc Ammonium Carbonate is frequently used to great advantage; however $Mg(OH)_2$ is also effective and sometimes desired.

Paints prepared from the emulsion polymer compositions of this invention may contain phosphate or borosilicate based corrosion inhibiting pigments such as Heucophos™ ZPO, Halox™ SPZ-391, Halox™ SZP-391 JM, Halox™ 430, or Halox™ CW-291. The paints prepared from the emulsion polymer compositions of this invention may contain organic corrosion inhibitors such as Halox™ 510, Halox™ 520 or Halox™ 570. The paints prepared from the emulsion polymer compositions of this invention may contain flash rust inhibitors such as nitrite salts, phosphate salts, benzoic acid salts, or Halox™ Flash-X 330. These ingredients are typically added to a direct to metal coating to reduce flash rusting and long term corrosion.

Paints prepared from the emulsion polymer compositions of this invention may contain tannin stain blocking additives to block the migration of tannins through the coating. These additives are typically based on multivalent cations such as $Zr^{2+}$ and $Zn^{2+}$ or solid inorganic materials capable of binding negatively charged tannins. The additives would include Stainban™ 185, Stainban™ 186, Stainban™ 187, Halox™ BW-100, Halox™ L-44, and Halox™ I-66. In addition ZnO is frequently added to these paints to improve tannin stain blocking. In many instances it is particularly desired to prepare paints which contain inorganic pigments with high aspect ratios. An example would be a platy talc such as Vertal™ 7. This is known to improve the tannin blocking character of the paint.

Paints prepared from the emulsion polymer compositions of this invention may contain UV absorbers and free radical scavengers. These are used to improve the long term exterior durability of a coating, or to protect the underlying substrate from UV degradation. This is particularly useful when formulating clear to semi transparent wood stains. The UV blockers can be organic materials such as benzotriazoles, or can be inorganic UV blockers such as sub 100 nm metal oxides. The free radical scavengers are based on hindered amine light stabilizers. Examples of UV blockers include Tinuvin 1130, trans iron oxides such as Tint-ayd CW5499 or Tint-ayd CW5600, nano zinc oxide, and nano titanium oxide. Combinations of Tinuvin 1130 with Tint-ayd CW5499 are particularly useful for semi transparent wood stains.

Paints prepared from the emulsion polymer compositions of this invention may contain waxes or surface modification additives such as silicone slip aids. Waxes may be used to reduce the gloss of the paint and maintain a high level of coffee, wine, or tea stain resistance. These waxes also can improve the burnish resistance of the coating. Examples of such waxes include Ceraflour™ 916, Ceraflour™ 920, and Ceraflour™ 962. Waxes may also be used to improve the mar and scratch resistance of the paint. An example would be Michem Emulsion™ 39235. Slicone slip aids may also be used to improve mar and scratch. An example would be Tego Glide™ 410.

Paints prepared from the emulsion polymer compositions of this invention may contain reactive silanes which contain an epoxy group or an amine group. The silane can be a trialkoxy, a dialkoxy, or a mono alkoxy. The alkoxy groups are typically methoxy, ethoxy, or propoxy. In the case of the dialkoxy, or a mono alkoxy materials the silicon atom is bonded to a methyl group. For example, monomethyldimethoxy silane would be common siloxane group. Trialkoxy, and dialkoxy silanes based on methoxy or ethoxy are preferred. The emulsion polymer may also contain reactive groups such as epoxy or acetoacetoxy which can react with the amine functional portion of the amino silane. An example of a useful amino silane would be Silquest A-1100 which is □-amino propyl-triethoxysilane. □-amino propylmethyldimethoxysilane is a useful coupling agent for adhesion to metal oxides such as aluminum oxide. An example of useful epoxy silanes are Silquest A-186 and Silquest A-187. The silanes are typically used at around 1% and provide for adhesion to metals and metal oxide surfaces. They can also be used to crosslink the paint.

Many other variations embodiments of the invention will be apparent to those skilled in the art and such variations are contemplated within the broad scope of the present invention.

Further aspects of the invention and preferred features thereof are given in the claims herein.

Tests

Minimum Film Forming Temperature

The minimum film forming temperature (MFFT) of a dispersion as used herein is the temperature where the dispersion forms a smooth and crack free coating or film using DIN 53787 and when applied using a Sheen MFFT bar SS3000.

Koenig Hardness

Koenig hardness as used herein is a standard measure of hardness, being a determination of how the viscoelastic properties of a film formed from the dispersion slows down a swinging motion deforming the surface of the film, and is measured according to DIN 53157 NEN5319.

Glass Transition Temperature (Tg)

As is well known, the glass transition temperature of a polymer is the temperature at which it changes from a glassy, brittle state to a plastic, rubbery state. The glass transition temperatures may be determined experimentally using Differential Scanning calorimetry (DSC), taking the peak of the derivative curve as Tg, or calculated from the Fox equation. Thus the Tg, in degrees Kelvin, of a copolymer having "n" copolymerised comonomers is given by the weight fractions W of each comonomer type and the Tgs of the homopolymers (in degrees Kelvin) derived from each comonomer according to the equation:

$$\frac{1}{Tg} = \frac{W_1}{Tg_1} + \frac{W_2}{Tg_2} + \ldots \frac{W_n}{Tg_n}$$

The calculated Tg in degrees Kelvin may be readily converted to ° C.

Solids Content

The solids content of an aqueous dispersion of the invention is usually within the range of from about 20 to 65 wt-% on a total weight basis, more usually 30 to 55 wt-%. Solids content can, if desired, be adjusted by adding water or removing water (e.g. by distillation or ultrafiltration).

pH Value

The pH value of the dispersion of the invention can be from 2 to 10 and mostly is from 6 to 9.5.

Blocking

Block Resistance Measurement [Includes Blocking and Early Blocking]:

Step 1: Blocking:

A 100 micron wet film of the aqueous emulsion of the invention to which 10% butyldiglycol is added is cast on to a paper substrate and dried for 16 hours at 52° C.

Step 1: Early Blocking:

A 250 micron wet film of the aqueous emulsion of the invention to which 10% butyldiglycol was added, is cast on to a paper substrate and dried for 24 hours at room temperature.

Step 2: Blocking and Early Blocking:

After cooling down to room temperature two pieces of coated film are placed with the coated side against each other under a load of 1 Kg/cm.sup.2 for 4 hours at 52° C. After this time interval the load on the samples is removed and the samples are left to cool down to room temperature (22+−2° C.). When the two coatings can be removed from each other without any damage to the film (do not stick) the block resistance is very good and assessed as a 5. When they however completely stick together, block resistance is very bad and assessed as a 0.

Gas Chromatography Mass Spectrometry (GCMS)

To confirm polymerisation is substantially complete the content of free itaconate ester monomers content can be determined by GCMS. The GCMS analyses were performed on a Trace GC-DSQ MS (Interscience, Breda, the Netherlands) equipped with a CTC combi Pal robotic autosampler for head space has been used. The carrier gas was Helium and a CP Sil 5 low bleed/MS, 25 m×0.25 mm i.d., 1.0 μm (CP nr. 7862) column has been used.

The GC-oven was programmed from 50° C. (5 min) followed by different sequential temperature ramps of 5° C./min to 70° C. (0 min), 15° C./min to 220° C. (0 min), and ending with 25° C./min to 280° C. (10 min). A continuous Helium flow of 1.2 ml/min was used. A hot split injection at 300° C. was performed on a programmed temperature vaporizer (PTV). The injection volume was 1 μl. The MS transfer line and ion source were both kept at 250° C. The samples were measured with single ion monitoring (SIM). For the specific case of dibutyl itaconate (DBI) the masses 127.0 and 59.0 Da were used, for the internal standard (iso butyl acrylate) the masses 55.0 and 73.0 were applied. The sample solutions were approximately 500 mg in 3 ml of internal standard solution (iso butyl acrylate in acetone). The calibration was performed with 5 different concentration levels from 0 to 500 ppm. The calculation was performed using Microsoft Excel with a linear calibration curve.

Molecular Weight

Unless the context clearly dictates otherwise the term molecular weight of a polymer or oligomer as used herein denotes weight average molecular weight (also denoted as $M_w$). $M_w$ may be measured by any suitable conventional method for example by Gas Phase Chromatography (GPC—performed similarly to the GCMS method described above) and/or by the SEC method described below. GPC method is preferred Determination of Molecular Weight of a Polymer Using SEC The molecular weight of a polymer may also be determined using Size Exclusion Chromatography (SEC) with tetrahydrofuran as the eluent or with 1,1,1,3,3,3 hexafluoro isopropanol as the eluent.

1) Tetrahydrofuran

The SEC analyses were performed on an Alliance Separation Module (Waters 2690), including a pump, auto injector, degasser, and column oven. The eluent was tetrahydrofuran (THF) with the addition of 1.0 vol % acetic acid. The injection volume was 150 μl. The flow was established at 1.0 ml/min. Three PL MixedB (Polymer Laboratories) with a guard column (3 μm PL) were applied at a temperature of 40° C. The detection was performed with a differential refractive index detector (Waters 410). The sample solutions were prepared with a concentration of 20 mg solids in 8 ml THF (+1 vol % acetic acid), and the samples were dissolved for a period of 24 hours. Calibration is performed with eight polystyrene standards (polymer standard services), ranging from 500 to 4,000,000 g/mol. The calculation was performed with Millennium 32 software (Waters) with a third order calibration curve. The obtained molar masses are polystyrene equivalent molar masses (g/mol).

2) 1,1,1,3,3,3 hexafluoro isopropanol

The SEC analyses were performed on a Waters Alliance 2695 (pump, degasser and autosampler) with a Shodex RI-101 differential refractive index detector and Shimadzu CTO-20AC column oven. The eluent was 1,1,1,3,3,3 hexafluoro isopropanol (HFIP) with the addition of 0.2M potassium trifluoro acetate (KTFA). The injection volume was 50 μl. The flow was established at 0.8 ml/min. Two PSS PFG Linear XL columns (Polymer Standards Service) with a guard column (PFG PSS) were applied at a temperature of 40° C. The detection was performed with a differential refractive index detector. The sample solutions were prepared with a concentration of 5 mg solids in 2 ml HFIP (+0.2M KTFA), and the samples were dissolved for a period of 24 hours. Calibration is performed with eleven polymethyl methacrylate standards (polymer standard services), ranging from 500 to 2,000,000 g/mol. The calculation was performed with Empower Pro software (Waters) with a third order calibration curve. The molar mass distribution is obtained via conventional calibration and the molar masses are polymethyl methacrylate equivalent molar masses (g/mol).

Standard Conditions

As used herein, unless the context indicates otherwise, standard conditions (e.g. for drying a film) means a relative humidity of 50%±5%, ambient temperature (which denotes herein a temperature of 23° C.±2°) and an air flow of ≤(less than or equal to) 0.1 m/s.

The following examples are provided to further illustrate the processes and compositions of the present invention. These examples are illustrative only and are not intended to limit the scope of the invention in any way. Unless otherwise specified all parts, percentages, and ratios are on a weight basis. The prefix C before an example indicates that it is comparative.

Various registered trademarks, other designations and/or abbreviations are used herein to denote some of ingredients used to prepare polymers and compositions of the invention. These are identified below by chemical name and/or tradename and optionally their manufacturer or supplier from whom they are available commercially. However where a chemical name and/or supplier of a material described herein is not given it may easily be found for example in reference literature well known to those skilled in the art: such as: 'McCutcheon's Emulsifiers and Detergents', Rock Road, Glen Rock, N.J. 07452-1700, USA, 1997 and/or Hawley's Condensed Chemical Dictionary (14th Edition) by Lewis, Richard J., Sr.; John Wiley & Sons.

In the examples the following abbreviations/monomers may be used:

DBI denotes dibutyl itaconate (may be (partly) bio-renewable)
DEI denotes diethyl itaconate (may be (partly) bio-renewable)
DMI denotes dimethyl itaconate (may be (partly) bio-renewable)
MMA denotes methyl methacrylate (may be (partly) bio-renewable)
BA denotes butyl acrylate (may be (partly) bio-renewable)
STY denotes styrene
IA denotes itaconic acid (may be bio-renewable)
IANH denotes itaconic anhydride (may be bio-renewable)
AA denotes acrylic acid (may be bio-renewable)
MAA denotes methacrylic acid (may be bio-renewable)
AIBN denotes azobisisobutyronitrile
DTPO denotes di-tertiairy butyl peroxide
PEG350 denotes the methoxy polyethylene glycol methacrylate available commerically from Cognis (part of BASF) under the trade mark Bisomer® mPEG350MA.

EXAMPLES

Components

Desmodur W dicyclohexylmethane diisocyanate (ex. Bayer)
Voranol 2000 Polypropylene glycol diol with molecular weight 2000 (ex. DOW)
DMI DiMethyl Itaconate
DEI DiEthyl Itaconate
DBI DiButyl Itaconate
S Styrene
MMA Methyl Methacrylate
BA Butyl Acrylate
DAAM DiAcetone AcrylAmide
ADH Adipic DiHydrazide
Plex PLEX 6852 (Ex. Evonik)
DVB DiVinyl Benzene
tBHPO tert-hydroperoxide (used as 70 wt-% solution)
FeEDTA Iron Ethylenediaminetetraacetic acid (used as 1 wt-% solution)
iAA Iso-ascorbic acid (used as 1 wt-% solution)

Urethane Prepolymer Emulsion I

The urethane prepolymer was prepared in a three neck round bottom flask, equipped with a thermometer, mechanical stirrer and heating mantle. It was made under a nitrogen atmosphere. 0.16 parts of stannous octoate were added to 922.09 parts of Desmodur W, 216.00 parts of DMPA, 301.91 parts of Voranol P2000, and 360.00 parts of NMP. Another 0.15 parts of stannous octoate were added after one hour reaction at a temperature of 90° C. The residual NCO content was 7.72% (theoretical 8.21%). The prepolymer was neutralised with 162.97 parts of triethyl amine at 75° C. The mixture was mixed for half an hour. The neutralised prepolymer was dispersed in 5404.53 parts of demineralised water during 60 minutes. After dispersion, 75.87 parts of hydrazine monohydrate were added to extend the prepolymer. The final polyurethane dispersion had a pH of 7.5, and a solids content of 20%.

Urethane Prepolymer Emulsion II

The urethane prepolymer was prepared in a three neck round bottom flask, equipped with a thermometer, mechanical stirrer and heating mantle. It was made under a nitrogen atmosphere. 0.16 parts of stannous octoate were added to 922.09 parts of Desmodur W, 216.00 parts of DMPA, 301.91 parts of Voranol P2000, and 360.00 parts of NMP. Another 0.15 parts of stannous octoate were added after one hour reaction at a temperature of 90° C. The residual NCO content was 7.72% (theoretical 8.21%). The prepolymer was neutralised with 162.97 parts of triethyl amine at 75° C. The mixture was mixed for half an hour. The neutralised prepolymer was dispersed in 4025.57 parts of demineralised water during 60 minutes. After dispersion, 75.87 parts of hydrazine monohydrate were added to extend the prepolymer. The final polyurethane dispersion had a pH of 7.8, and a solids content of 25%.

Example 1

Preparation of an Aqueous 80/20 Polyurethane/Vinyl Polymer Dispersion According to the Invention The following process was used to prepare an aqueous polyurethane/acrylic polymer dispersion with a polyurethane/vinyl polymer weight ratio of 20/80.

3513 parts of the polyurethane prepolymer emulsion I and 252 parts of demineralized water, were charged to a round bottom flask, equipped with a thermometer, mechanical stirrer, condenser and heating mantle. During the preparation of the polyurethane/vinyl polymer dispersion a nitrogen atmosphere was maintained. To all iso-ascorbic acid solutions sufficient ammonia was added to raise pH to a value of between 8 and 8.5. To the polyurethane dispersion were added 326 parts of a monomer feed comprising components in a ratio as depicted in Table 1. The reactor contents were stirred at 60° C. for one hour. Then 3 parts of a t-butyl hydroperoxide solution (70 wt-% in water) and 17 parts of demineralized water were added to this mixture, followed by 0.05 parts of an Fe EDTA solution (1 wt-% in water) and 24 parts of an iso-ascorbic acid solution (1 wt-% in water) which started the reaction. The batch was kept at peak temperature for 15 minutes. After the batch was cooled to 60° C., 435 parts of a second monomer feed comprising components in a ratio as shown in Table 1, and the contents were stirred for one hour. To this mixture 30 parts of an iso-ascorbic acid solution (1 wt-%) were added and the reaction started. The batch was kept at peak temperature for 15 minutes. After the batch was cooled to 60° C., 544 parts of a third monomer feed comprising components in a ratio as shown in Table 1 were added. The contents were mixed for one hour, 38 parts of an iso-ascorbic acid solution (1 wt-%) were added which started the radical polymerisation. After 5 minutes another 38 parts of an iso-ascorbic acid solution (1 wt-%) were added and the batch was kept at peak temperature for 15 minutes. Then the final 38 parts of an iso-ascorbic acid solution were added. The mixture was stirred for half an hour and cooled to room temperature. To emulsions containing DAAM 70 mole-% based on DAAM concentration of ADH was added. The solids content was adjusted to 35% using demineralized water. The resulting polyurethane/acrylic polymer dispersion had a solids content of 35% and a pH of about 8.

TABLE 1

| Ex | DMI | DEI | DBI | S | MMA | BA | DAAM* | DVB | pH |
|---|---|---|---|---|---|---|---|---|---|
| 1.1 | 40 | | | 60 | | | | | 7.8 |
| 1.2 | | 45 | | 55 | | | | | 7.9 |
| 1.3 | | | 35 | 65 | | | | | 7.8 |
| 1.4 | | | 35 | | 65 | | | | 7.8 |
| 1.5 | 42 | | | | | 50 | 8 | | 7.7 |
| 1.6 | 49 | | | 50 | | | | 1 | 7.8 |

*Per part of DAAM 0.36 parts of ADH are added to the aqueous emulsion at the end of the production process

Example 2

Preparation of an Aqueous 50/50 Polyurethane/Vinyl Polymer Dispersion According to the Invention The following process was used to prepare an aqueous polyurethane/acrylic polymer dispersion with a polyurethane/vinyl polymer weight ratio of 50/50.

3871 parts of the polyurethane prepolymer emulsion II and 101 parts of demineralized water, were charged to a round bottom flask, equipped with a thermometer, mechanical stirrer, condenser and heating mantle. To all iso-ascorbic acid solutions sufficient ammonia was added to raise pH to a value of between 8 and 8.5. During the preparation of the polyurethane/vinyl polymer dispersion a nitrogen atmosphere was maintained. To the polyurethane dispersion were added 484 parts of a monomer feed comprising components in a ratio as depicted in Table 2. The reactor contents were stirred at 60° C. for one hour. Then 9 parts of a t-butyl hydroperoxide solution (70 wt-% in water) and 51 parts of demineralized water were added to this mixture, followed by 0.05 parts of a Fe EDTA solution (1 wt-% in water) and 68 parts of an iso-ascorbic acid solution (1 wt-% in water) which started the reaction. The batch was kept at peak temperature for 15 minutes. Next, a second feed of 484 parts of monomers comprising components in a ratio as shown in Table 2 were added and the batch was stirred at 60° C. for one hour. Next, 68 parts of an iso-ascorbic acid solution (1 wt-%) were added. The batch was kept at peak temperature for 15 minutes, after which 45 parts of an iso-ascorbic acid solution (1 wt-% in water) were added and the mixture was stirred for half an hour and cooled to room temperature. The solids content of the emulsion was adjusted to 35% using demineralized water. The resulting polyurethane/vinyl polymer dispersion had a solids content of 35% and a pH of about 8.

TABLE 2

|  | DMI | DBI | S | BA | Plex | pH |
|---|---|---|---|---|---|---|
| 2.1 | 35 |  | 65 |  |  | 7.7 |
| 2.2 | 50 |  |  | 50 |  | 7.6 |
| 2.3 | 10 | 30 | 60 |  |  | 7.6 |
| 2.4 |  | 45 |  | 55 |  | 7.7 |
| 2.5 | 35 |  |  | 60 | 5 | 7.7 |

Example 3

Preparation of an Aqueous 50/50 Polyurethane/Vinyl Polymer Dispersion According to the Invention The following process was used to prepare an aqueous polyurethane/acrylic polymer dispersion with a polyurethane/vinyl polymer weight ratio of 50/50.

3830 parts of the polyurethane prepolymer emulsion II were charged to a round bottom flask, equipped with a thermometer, mechanical stirrer, condenser and heating mantle. To all iso-ascorbic acid solutions sufficient ammonia was added to raise pH to a value of between 8 and 8.5. During the preparation of the polyurethane/vinyl polymer dispersion a nitrogen atmosphere was maintained. To the polyurethane dispersion were 479 parts of a monomer feed comprising components in a ratio as depicted in Table 3. The reactor contents were stirred at 60° C. for one hour. Then 9 parts of a t-butyl hydroperoxide solution (70 wt-% in water) and 51 parts of demineralized water were added to this mixture, followed by 0.1 parts of an Fe EDTA solution (1 wt-% in water) and 67 parts of an iso-ascorbic acid solution (1 wt-% in water) which started the reaction. The batch was kept at peak temperature for 15 minutes. After the batch was cooled to 60° C., 479 parts of a second monomer feed comprising components in a ratio as shown in Table 3, and the contents were stirred for one hour. To this mixture 89 parts of an iso-ascorbic acid solution (1 wt-% in water) were added and the reaction started. The batch was kept at peak temperature for 15 minutes. Then a final 111 parts of an iso-ascorbic acid solution (1 wt-% in water) were added. The mixture was stirred for half an hour and cooled to room temperature. To emulsions containing DAAM 70 mole-% based on DAAM concentration of ADH was added. The solids content of the emulsion was adjusted to 35% using demineralized water. The resulting polyurethane/vinyl polymer dispersion had a solids content of 35% and a pH of about 8.

TABLE 3

|  | DMI | DBI | S | DVB | BA | DAAM* | Plex | pH |
|---|---|---|---|---|---|---|---|---|
| 3.1 | 45 |  | 55 |  |  |  |  | 7.8 |
| 3.2 | 32 |  | 60 |  |  | 8 |  | 7.7 |
| 3.3 | 35 |  |  |  | 57 | 8 |  | 7.7 |
| 3.4 |  | 35 | 60 |  |  |  | 5 | 7.7 |
| 3.5 | 39 |  |  | 1 | 60 |  |  | 7.8 |

*Per part of DAAM 0.36 parts of ADH are added to the aqueous emulsion at the end of the production process Film Properties To assess the merits of the invention, film properties were assessed for emulsions from each of the Tables. For this purpose, emulsions were formulated with 10 wt-% of ethyl diglycol, after which the formulated binders were stored at room temperature for Results are listed below in Table 4:

TABLE 4

|  |  | König | Chemical resistance* | | | |
|---|---|---|---|---|---|---|
| Ex | MFT (° C.) | hardness (s) | Water (16 hrs) | EtOH (1 hr) | Andy (16 hrs) | Coffee (16 hrs) |
| 1.1 | >90 | 200 | 5 | 1 | 5 | 5 |
| 1.6 | >90 | 200 | 5 | 1 | 5 | 5 |
| 2.2 | 9 | 150 | 5 | 3 | 3 | 5 |
| 2.5 | <5 | 118 | 5 | 5 | 2 | 5 |
| 3.2 | 60 | 205 | 5 | 5 | 4-5 | 5 |
| 3.4 | 38 | 184 | 5 | 5 | 4-5 | 4 |

The invention claimed is:

1. An aqueous copolymer composition comprising:
   a) 10 to 95 wt % of a polyurethane copolymer, and
   b) 5 to 90 wt % of a polyvinyl copolymer which is a polymerization reaction product of a monomer composition comprising from 30 parts to 100 parts by weight of at least one $C_{4-6}$ unsaturated diacid and/or derivative thereof per 100 parts by weight of the monomer composition, wherein the at least one $C_{4-6}$ unsaturated diacid and/or derivative thereof comprises an amount of carbon 14 sufficient to produce a decay of at least about 1.5 disintegrations per minute per gram carbon (dpm/gC); and wherein
   the polyvinyl copolymer has a residual monomer level of less than 5000 ppm as determined by gas chromatography mass spectrometry (GCMS).

2. The composition according to claim 1, wherein the at least one $C_{4-6}$ unsaturated diacid and/or derivative thereof comprises at least one mono-ethylenically unsaturated dicarboxylic acid having from 4 to 6 carbon atoms in the acidic moiety and/or a derivative thereof.

3. The composition according to claim 2, wherein the at least one mono-ethylenically unsaturated $C_{4-6}$ dicarboxylic acid and/or derivative thereof comprises at least one pentendioic acid and/or derivative thereof.

4. The composition according to claim 3, wherein the at least one pentendioic acid and/or derivative thereof comprises at least one itaconate functional monomer.

5. The composition according to claim 4, wherein the at least one itaconate functional monomer comprises at least one di($C_{4-10}$alkyl) itaconate.

6. The composition according to claim 5, wherein the at least one di($C_{4-10}$ alkyl) itaconate comprises at least one dibutyl itaconate (DBI).

7. The composition according to claim 4, wherein the at least one itaconate functional monomer comprises at least one di($C_{1-3}$alkyl) itaconate.

8. The composition according to claim 7, wherein the at least one di($C_{1-3}$ alkyl) itaconate comprises at least one dimethyl itaconate (DMI).

9. A process for preparing an aqueous polymer composition as claimed in claim 1, the process comprising the steps of:
   (i) preparing an aqueous dispersion of a polyurethane copolymer;
   (ii) preparing an aqueous polyvinyl copolymer dispersion, optionally in the presence of the polyurethane obtained from step (i), from a monomer composition, comprising 30 to 100 parts by weight of at least one $C_{4-6}$ unsaturated diacid and/or derivative thereof per 100 parts by weight of the monomer composition, wherein at least one $C_{4-6}$ unsaturated diacid and/or derivative thereof comprises an amount of carbon 14 sufficient to produce a decay of at least about 1.5 dpm/gC;
   (iii) optionally mixing the polyurethane (a) obtained from step (i) with the polyvinyl copolymer (b) obtained from step (ii) to form an aqueous urethane acrylate dispersion.

10. A polymer composition obtained by the process according to claim 9.

11. A coating composition comprising the polymer composition according to claim 1.

12. A substrate and/or article having a coating thereon which comprises the coating composition according to claim 11.

13. A method for preparing a coated substrate and/or article comprising the steps of applying a coating which comprises the coating composition according to claim 11 onto the substrate and/or article and optionally curing the coating composition in situ to form a cured coating thereon.

* * * * *